(12) United States Patent
Kotrla et al.

(10) Patent No.: US 8,976,797 B2
(45) Date of Patent: *Mar. 10, 2015

(54) SYSTEM AND METHOD FOR INDICATING CLASSIFICATION OF A COMMUNICATIONS FLOW

(71) Applicant: Verizon Business Global LLC, Ashburn, VA (US)

(72) Inventors: Scott R. Kotrla, Wylie, TX (US); David E. McDysan, Great Falls, VA (US); Michael Bencheck, Basking Ridge, NJ (US); Matthew William Turlington, Basking Ridge, NJ (US); Richard C. Schell, Ashburn, VA (US); Nick DelRegno, Rowlett, TX (US); Ross S. Hardin, Plano, TX (US); Lee D. Bengston, Murphy, TX (US); William Drake, Garland, TX (US); Howard Chiu, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,695

(22) Filed: Oct. 10, 2012

(65) Prior Publication Data

US 2013/0272161 A1    Oct. 17, 2013

Related U.S. Application Data

(63) Continuation of application No. 10/860,803, filed on Jun. 3, 2004, now Pat. No. 8,289,973.

(51) Int. Cl.
*H04L 12/28*    (2006.01)
*H04L 12/721*    (2013.01)
(Continued)

(52) U.S. Cl.
CPC ............ *H04L 45/66* (2013.01); *H04L 12/4633* (2013.01); *H04L 45/50* (2013.01); *H04L 47/10* (2013.01)
USPC ....... 370/395.42; 370/428; 370/466; 709/249

(58) Field of Classification Search
CPC ..... H04L 12/4633; H04L 45/50; H04L 45/66; H04L 47/10; H04L 12/2856
USPC ............... 370/395.5, 395.51, 395.52, 395.64, 370/395.65, 428, 249, 466, 467
See application file for complete search history.

(56) References Cited

U.S. PATENT DOCUMENTS 5,159,592 A    10/1992  Perkins
5,412,647 A    5/1995   Giroux et al.

(Continued)

FOREIGN PATENT DOCUMENTS

EP    0975192    1/2000
EP    1065858    1/2001

(Continued)

OTHER PUBLICATIONS

"IEEE Standards for Local and Metropolitan Area Networks: Virtual Bridged Local Area Networks," XP-002240505, ISBN 0-7381-1537-1, Institute of Electrical and Electronics Engineers, Inc., 90 pages, 1Q 1998.

(Continued)

*Primary Examiner* — Ayaz Sheikh
*Assistant Examiner* — Mounir Moutaouakil

(57) ABSTRACT

System and method for providing a layer 2 switch in the access network that switches based upon one or more carrier tags identifying customer traffic. Customer traffic conforming to any variety of different layer 1 or layer 2 protocols may be encapsulated and identified according to carrier tag values. The layer 2 switch may determine how to handle the traffic by interpreting and manipulating the carrier tag values. The layer 2 switch may be capable of switching TDM input traffic to either TDM or packet output traffic, and switching packetized input traffic to either TDM or packet output traffic. Handling classification values may also be processed by the layer 2 switch to affect prioritization of handling of encapsulated traffic.

9 Claims, 14 Drawing Sheets

(51) Int. Cl.
*H04L 12/46* (2006.01)
*H04L 12/723* (2013.01)
*H04L 12/801* (2013.01)

(56) References Cited

U.S. PATENT DOCUMENTS

| | | | |
|---|---|---|---|
| 5,805,600 A | 9/1998 | Venters et al. | |
| 5,809,021 A | 9/1998 | Diaz et al. | |
| 5,910,954 A | 6/1999 | Bronstein et al. | |
| 5,987,034 A | 11/1999 | Simon et al. | |
| 5,999,532 A | 12/1999 | Terasaki | |
| 6,205,488 B1 | 3/2001 | Casey et al. | |
| 6,333,917 B1 | 12/2001 | Lyon et al. | |
| 6,339,595 B1 | 1/2002 | Rekhter et al. | |
| 6,381,649 B1 | 4/2002 | Carlson | |
| 6,499,061 B1* | 12/2002 | Benayoun et al. | 709/245 |
| 6,603,756 B1 | 8/2003 | Tappan | |
| 6,634,297 B2 | 10/2003 | Poetter et al. | |
| 6,636,512 B1 | 10/2003 | Lorrain et al. | |
| 6,643,297 B1 | 11/2003 | Sproat et al. | |
| 6,731,649 B1 | 5/2004 | Silverman | |
| 6,735,187 B1 | 5/2004 | Helander et al. | |
| 6,775,283 B1 | 8/2004 | Williams | |
| 6,778,494 B1 | 8/2004 | Mauger | |
| 6,870,812 B1 | 3/2005 | Kloth et al. | |
| 6,898,213 B1 | 5/2005 | Shimelmitz et al. | |
| 6,904,061 B2 | 6/2005 | Schmitt et al. | |
| 6,934,250 B1 | 8/2005 | Kejriwal et al. | |
| 6,944,168 B2 | 9/2005 | Paatela et al. | |
| 6,950,393 B1 | 9/2005 | Ben Nun et al. | |
| 6,963,561 B1 | 11/2005 | Lahat | |
| 6,977,932 B1 | 12/2005 | Hauck | |
| 6,985,488 B2 | 1/2006 | Pan et al. | |
| 7,031,312 B1 | 4/2006 | Jayakumar et al. | |
| 7,031,607 B1 | 4/2006 | Aswood Smith | |
| 7,068,654 B1 | 6/2006 | Joseph et al. | |
| 7,092,389 B2 | 8/2006 | Chase et al. | |
| 7,120,151 B1 | 10/2006 | Ginjpalli et al. | |
| 7,126,907 B2 | 10/2006 | Carpini et al. | |
| 7,130,261 B1 | 10/2006 | Skrzynski et al. | |
| 7,164,692 B2 | 1/2007 | Cox et al. | |
| 7,227,867 B1 | 6/2007 | Ferguson et al. | |
| 7,289,538 B1 | 10/2007 | Paradise et al. | |
| 7,330,481 B2 | 2/2008 | Jones et al. | |
| 7,411,904 B2 | 8/2008 | Foote et al. | |
| 7,463,639 B1 | 12/2008 | Rekhter | |
| 7,480,306 B2 | 1/2009 | Unbehagen et al. | |
| 8,218,569 B2 | 7/2012 | DelRegno et al. | |
| 8,340,102 B2 | 12/2012 | DelRegno | |
| 2001/0036172 A1 | 11/2001 | Haskal | |
| 2002/0075542 A1 | 6/2002 | Kumar et al. | |
| 2002/0078384 A1 | 6/2002 | Hippelainen | |
| 2002/0085563 A1 | 7/2002 | Mesh et al. | |
| 2002/0114274 A1 | 8/2002 | Sturges et al. | |
| 2002/0126633 A1 | 9/2002 | Mizutani et al. | |
| 2002/0131408 A1 | 9/2002 | Hsu et al. | |
| 2002/0146026 A1 | 10/2002 | Unitt et al. | |
| 2002/0150100 A1 | 10/2002 | White et al. | |
| 2002/0152319 A1 | 10/2002 | Amin et al. | |
| 2002/0163935 A1* | 11/2002 | Paatela et al. | 370/466 |
| 2002/0167949 A1 | 11/2002 | Bremer et al. | |
| 2002/0176139 A1 | 11/2002 | Slaughter et al. | |
| 2003/0012184 A1 | 1/2003 | Walker et al. | |
| 2003/0016672 A1 | 1/2003 | Rosen et al. | |
| 2003/0021287 A1 | 1/2003 | Lee et al. | |
| 2003/0026206 A1 | 2/2003 | Mullendore et al. | |
| 2003/0043830 A1 | 3/2003 | Floyd et al. | |
| 2003/0056006 A1 | 3/2003 | Katsube et al. | |
| 2003/0112756 A1 | 6/2003 | Le Gouriellec et al. | |
| 2003/0145246 A1* | 7/2003 | Suemura | 714/2 |
| 2003/0147352 A1 | 8/2003 | Ishibashi et al. | |
| 2003/0147412 A1 | 8/2003 | Weyman et al. | |
| 2003/0185201 A1 | 10/2003 | Dorgan | |
| 2003/0231640 A1* | 12/2003 | Basso et al. | 370/401 |
| 2004/0028051 A1 | 2/2004 | Etemadi et al. | |
| 2004/0028064 A1 | 2/2004 | Cetin et al. | |
| 2004/0037290 A1 | 2/2004 | Valadarsky et al. | |
| 2004/0042480 A1 | 3/2004 | Sproat et al. | |
| 2004/0044789 A1 | 3/2004 | Angel et al. | |
| 2004/0066780 A1 | 4/2004 | Shankar et al. | |
| 2004/0076166 A1 | 4/2004 | Patenaude | |
| 2004/0081172 A1 | 4/2004 | Ould-Brahim | |
| 2004/0081203 A1 | 4/2004 | Sodder et al. | |
| 2004/0088430 A1 | 5/2004 | Busi et al. | |
| 2004/0090967 A1 | 5/2004 | Doidge et al. | |
| 2004/0123232 A1 | 6/2004 | Hodges et al. | |
| 2004/0153570 A1 | 8/2004 | Shobatake | |
| 2004/0156313 A1 | 8/2004 | Hofmeister et al. | |
| 2004/0156389 A1 | 8/2004 | Sha | |
| 2004/0158626 A1 | 8/2004 | Douglas | |
| 2004/0162919 A1 | 8/2004 | Williamson et al. | |
| 2004/0165600 A1 | 8/2004 | Lee | |
| 2004/0170160 A1 | 9/2004 | Li et al. | |
| 2004/0170167 A1 | 9/2004 | Cohen | |
| 2004/0170173 A1 | 9/2004 | Pan et al. | |
| 2004/0174882 A1 | 9/2004 | Willis | |
| 2004/0179555 A1 | 9/2004 | Smith | |
| 2004/0190548 A1 | 9/2004 | Harel et al. | |
| 2004/0202148 A1 | 10/2004 | Kuehnel | |
| 2004/0208198 A1 | 10/2004 | Christie et al. | |
| 2004/0213232 A1 | 10/2004 | Regan | |
| 2004/0221051 A1* | 11/2004 | Liong et al. | 709/230 |
| 2004/0246891 A1 | 12/2004 | Kay et al. | |
| 2004/0252717 A1 | 12/2004 | Solomon et al. | |
| 2004/0255028 A1 | 12/2004 | Chu et al. | |
| 2005/0002333 A1 | 1/2005 | Aalders et al. | |
| 2005/0044262 A1 | 2/2005 | Luo | |
| 2005/0047341 A1 | 3/2005 | Kim et al. | |
| 2005/0141504 A1 | 6/2005 | Rembert et al. | |
| 2005/0147104 A1 | 7/2005 | Ould-Brahim | |
| 2005/0160180 A1 | 7/2005 | Rabje et al. | |
| 2005/0190757 A1 | 9/2005 | Sajassi | |
| 2006/0002419 A1 | 1/2006 | Cox et al. | |
| 2006/0018313 A1 | 1/2006 | Oki et al. | |
| 2006/0159019 A1 | 7/2006 | Buskirk et al. | |
| 2006/0209840 A1 | 9/2006 | Paatela et al. | |
| 2007/0274321 A1 | 11/2007 | Jonsson et al. | |
| 2007/0286198 A1 | 12/2007 | Muirhead et al. | |
| 2008/0159174 A1 | 7/2008 | Enomoto et al. | |
| 2009/0080431 A1 | 3/2009 | Rekhter | |
| 2009/0097490 A1 | 4/2009 | Sanderson et al. | |
| 2011/0292948 A1 | 12/2011 | Delregno | |

FOREIGN PATENT DOCUMENTS

| | | |
|---|---|---|
| EP | 1133121 | 9/2001 |
| EP | 1176774 | 1/2002 |
| EP | 1292083 | 3/2003 |
| WO | WO-98/39879 | 9/1998 |
| WO | WO-00/46961 | 8/2000 |
| WO | WO-00/54469 | 9/2000 |
| WO | WO-01/15386 | 3/2001 |
| WO | WO-01/67804 | 9/2001 |
| WO | WO-01/71986 | 9/2001 |
| WO | WO-01/91416 | 11/2001 |
| WO | WO-02/15475 | 2/2002 |
| WO | WO-02/51069 | 6/2002 |
| WO | WO-02/078253 | 10/2002 |
| WO | WO-03/005648 | 1/2003 |
| WO | WO-03/019873 | 3/2003 |
| WO | WO-03/075501 | 9/2003 |
| WO | WO-03/077146 | 9/2003 |
| WO | WO-2004/010656 | 1/2004 |
| WO | WO-2004/025904 | 3/2004 |
| WO | WO-2004/049644 | 6/2004 |
| WO | WO-2004/102890 | 11/2004 |

OTHER PUBLICATIONS

Bonica, et al., "ICMP Extensions for MultiProtocol Label Switching (draft-bonica-icmp-mpls-02)," The Internet Society, pp. 1-10, Nov. 2000.

Bryant, et al., "PWE3 Architecture (draft-ietf-pwe3-arch-01)," Pseudo-Wire Edge-to-Edge (PWE3) Working Group, The Internet Society, pp. 1-42, Nov. 2002.

(56) References Cited

OTHER PUBLICATIONS

Bryant, et al., "PWE3 Architecture (draft-ietf-pwe3-arch-06)," Pseudo-Wire Edge-to-Edge (PWE3) Working Group, The Internet Society, 34 pages, Oct. 2003.
Bryant, et al., "PWE3 Architecture (draft-ietf-pwe3-arch-07)," Pseudo-Wire Edge-to-Edge (PWE3) Working Group, The Internet Society, pp. 1-44, Mar. 2003.
Lang, "Making the Fiber Connection," Zarlink Semiconductor Inc., Fiberoptic Product News, vol. 19, No. 2, Reed Electronic Group, pp. 15-16, Feb. 2004.
Martini, et al., "Pseudowire Setup and Maintenance Using LDP (draft-ietf-pwe3-control-protocol-06)," Network Working Group, The Internet Society, 33 pages, Mar. 2004.
Martini, et al., "Pseudowire Setup and Maintenance Using LDP (draft-ietf-pwe3-control-protocol-14)," Network Working Group, The Internet Society, 41 pages, Dec. 2004.
Martini, et al., "Transport of Layer 2 Frames Over MPLS (draft-ietf-pwe3-control-protocol-01.txt)," Network Working Group, The Internet Society, 22 pages, Nov. 2002.
Martini, et al., "Transport of Layer 2 Frames Over MPLS, RFC 4906," Network Working Group, Internet Engineering Task Force (IETF), http://tools.ietf.org/html/rfc4906, 42 pages, Jun. 2007.
Nadeau, et al., "Pseudo Wire (PW) Virtual Circuit Connection Verification (draft-ietf-pwe3-vccv-02)," Network Working Group, The Internet Society, 18 pages, Feb. 1, 2004.
Neogi, et al., "Design and Performance of a Network-Processor-Based Intelligent DSLAM," IEEE Network, vol. 17, No. 4, pp. 56-62, Jul.-Aug. 2003.
Pepelnjak, "MPLS and VPN Architectures, CCIP Edition," Chapter 9, MPLS/VPN Architecture Overview, five pages, May 23, 2002.
Pretty, et al., "Frame Relay Interworking with Asynchronous Transfer Mode," Global Telecommunications Conference (GLOBECOM '93), pp. 1854-1860 (vol. 3), Nov. 29-Dec. 2, 1993.
Shah, et al., "Qos Signaling for PW (draft-shah-pwe3-pw-dos-signaling-00)," PWE3 Working Group, The Internet Society, pp. 1-7, Jan. 2004.
Stein, "Pseudowire Customer Edge to Customer Edge Emulation (draft-stein-pwe3-pwce2e-00)," Pseudo-Wire Edge-to-Edge (PWE3) Working Group, The Internet Society, pp. 1-6, Oct. 20, 2003.
Walton, "Frame Relay to ATM Interworking," BT Laboratories, BT Technology Journal, vol. 16, No. 1, pp. 96-105, Jan. 1998.
Williams, "Optical Ethernet Architecture Evolution: The Logical Provider Edge," Metro Ethernet Forum, pp. 1-35, Aug. 28, 2003.
Xiao, et al., "Requirements for Pseudo-Wire Emulation Edge-to-Edge (PWE3) (draft-oetf-pwe3-requirements-08)," The Internet Society, pp. 1-20, Dec. 2003.
Zelig, et al., "Ethernet Pseudo Wire (PW) Management Information Base (draft-ietf-pwe3-enet-mica-03)," The Internet Society, pp. 1-21, Dec. 2003.
Zelig, et al., "Pseudo Wire (PW) Management Information Base (draft-ietf-pwe3-pw-mib-03)," The Internet Society, pp. 1-41, Jan. 2004.
Zelig, et al., "Pseudo Wire (PW) Over MPLS PSN Management Information Base (draft-ietf-pwe3-pw-mpls-mib-04)," The Internet Society, pp. 1-25, Dec. 2003.

* cited by examiner

US 8,976,797 B2

SYSTEM AND METHOD FOR INDICATING CLASSIFICATION OF A COMMUNICATIONS FLOW

PRIORITY CLAIM AND CROSS-REFERENCE TO RELATED APPLICATIONS

The present application claims priority to U.S. application Ser. No. 10/860,803 now U.S. Pat. No. 8,293,973 filed Jun. 3, 2004 entitled "System and Method For Indicating Classification of a Communications Flow" which claims benefit of U.S. Provisional Patent Application No. 60/560,009, filed Apr. 5, 2004, entitled "System and Method for using Labeled Flows in a Communications Access Network" the entireties of which are incorporated herein.

The present application is also related to the following co-pending applications, which are assigned to the assignee of the present application and incorporated herein by reference in their entireties:

U.S. patent application Ser. No. 10/858,502, filed on Jun. 1, 2004 and entitled "System and Method for a Communications Access Network;"

U.S. patent application Ser. No. 10/858,501, filed on Jun. 1, 2004 and entitled "System and Method for Controlling Communication Flow Rates;"

U.S. patent application Ser. No. 10/858,491, filed on Jun. 1, 2004 and entitled "Apparatus and Method for Terminating Service Emulation Instances;"

U.S. patent application Ser. No. 10/858,503, filed on Jun. 1, 2004 and entitled "Method and Apparatus for Processing Labeled Flows in a Communications Access Network;"

U.S. patent application Ser. No. 10/858,517, filed on Jun. 1, 2004 and entitled "System And Method For Providing A Multiple-Protocol Crossconnect;"

U.S. patent application Ser. No. 10/859,057, filed on Jun. 2, 2004 and entitled "Providing Applets to Remote Devices in a Telephony Network;"

U.S. patent application Ser. No. 10/858,868, filed on Jun. 2, 2004 and entitled "System and Method for Monitoring, Controlling and Provisioning a Telecommunications Access Network;"

U.S. patent application Ser. No. 10/859,463, filed on Jun. 2, 2004 and entitled "Error Detection and Reporting;"

U.S. patent application Ser. No. 10/860,609, filed concurrently herewith and entitled "System and Method for Transporting Time-Division Multiplexed Communications through a Packet-Switched Access Network;"

U.S. patent application Ser. No. 10/859,468, filed on Jun. 2, 2004 and entitled "Apparatus and Method for Testing and Fault Isolation in a Communication Network;" and U.S. patent application Ser. No. 10/858,525, filed on Jun. 1, 2004 and entitled "System And Method For Managing Communications In An Access Network."

TECHNICAL FIELD

The present invention relates generally to a system and method for providing telecommunications services, and more particularly, to a system and method for providing a multiple-protocol crossconnect in an access network.

BACKGROUND

A commercial telecommunications network operated by a service provider supports voice and data communications between customer locations and includes an access network and a core network. Generally, customer devices communicatively couple to the access network, which in turn connects to the core network. The access network includes what many people refer to as "the last mile," that is, the connectivity from a customer location, such as an office building, to a point where a service provider has significant facilities, such as a metro hub or a "service edge" at the periphery of the core network. In contrast to the access network, the core network usually provides transport of large aggregate flows over long distances and handles the selective routing of each customer's voice and data traffic to other locations served by the network. The access network generally comprises a series of switches, aggregators, multiplexers, demultiplexers, routers, hubs, and the like which collectively serve to provide connectivity between customers' equipment and the core network.

The services required by customers, residential or business, vary greatly in the type of access services, bandwidth, quality of service (QoS), type of legacy equipment, and the like. Types of services typically include frame relay services, asynchronous transfer mode (ATM) services, broadband services, and the like. Typically, an access network provides switching or routing of some nature for each of these types of services independently, which in turn requires the access service provider to provision each of these services separately. In particular, the access service provider must be capable of meeting the customer's current and future needs in terms of bandwidth, QoS, and the like.

Generally, each type of service utilizes different interface and framing standards, and in particular, each type of service typically utilizes a different set of protocols. As a result, current access network elements must be equipped to interface with and operate upon flows for each type of service the elements are expected to handle. Each network element in an access network presently must deal with the particular format, addressing and protocol aspects of each type of access communication service it supports. This makes for costly and complex network elements and interferes with having flexibility to accommodate rapid shifts in resources allocated to different flows or different service types and to accommodate adoption of new service types. Accordingly, there is a need for a switch, or other access network elements, to process flows conforming to a variety of service types and to route or switch traffic flows between a large number of customer premise equipments and one or more service edges. There is also a need for such a network element to manage and process flows in a manner that enhances scalability of the access network in handling a large number of flows. This includes the managing and processing of real-time flows that require expeditious handling, such as packet telephony signals.

SUMMARY OF THE INVENTION

These and other problems are generally solved or circumvented, and technical advantages are generally achieved, by embodiments of the present invention that provide a system and method for providing a high-density multiple-protocol crossconnect in an access network.

The present invention may be embodied in a method of processing communications in a communication system, the method comprising: receiving a first communication having a handling classification value; adding a carrier tag to the communication, wherein the carrier tag comprises a handling classification field; setting the handling classification field of the carrier tag according to the value of the handling classification field; and sending the communication including the carrier tag and the handling classification field.

The present invention may be embodied in a method of processing communications in a communication system, the method comprising: receiving a communication comprising a first carrier tag and a second carrier tag, wherein the first carrier tag comprises a first handling classification field and the second carrier tag comprises a second handling classification field; setting a value of the second handling classification field based upon a value of the first handling classification field; and sending the communication comprising the second handling classification field.

Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to embodiments in a specific context, such as providing switching and routing services in an access network utilizing service emulation instances implemented across layer 2 switching elements. The invention may employ other techniques to carry communications flows. The invention may also be applied, however, to other types of devices, networks, communications links, and the like. Furthermore, while specific network configurations are illustrated and discussed herein, it is noted that network configurations may vary to include fewer or additional elements, such as routers, gateways, bridges, ATM switches, frame relay switches, firewalls, switches, and the like. The illustrated embodiments are provided for illustrative purposes only and are provided only to aid in the explanation and understanding of the concepts of the present invention. Aspects of the present invention are equally applicable to many types and configurations of networks and communications protocols.

It is further noted that, unless indicated otherwise, all functions described herein may be performed in either hardware or software, or some combination thereof. In one embodiment, the functions are performed by a processor such as a computer or an electronic data processor in accordance with code such as computer program code, software, and/or integrated circuits that are coded to perform such functions, unless indicated otherwise.

Generally, the present invention provides a logical pipe or tunnel across the access network as identified by one or more carrier tags which are applied to the traffic and which have significance for how the traffic is to be handled in the access network. Quality of service (QoS) measures, such as rate shaping and policing, may be applied at either or both of the CPE and the service edge device. Where the layer 2 switch offers direct customer interfaces, the layer 2 switch may also be involved in functions such as rate shaping, policing, and the like to provide a specific QoS. A layer 2 switch provides the switching between the CPE and the service edge device by evaluating a layer 2 label or tag applied to the traffic. Other possible services in the access network include prioritization and/or marking of non-conforming traffic. Other aspects of the role of the layer 2 switch may include the functions, interfaces, and protocols needed to establish layer 2 forwarding of customer traffic across the access network in support of access to other services and/or native connections between customers.

Figure 1:
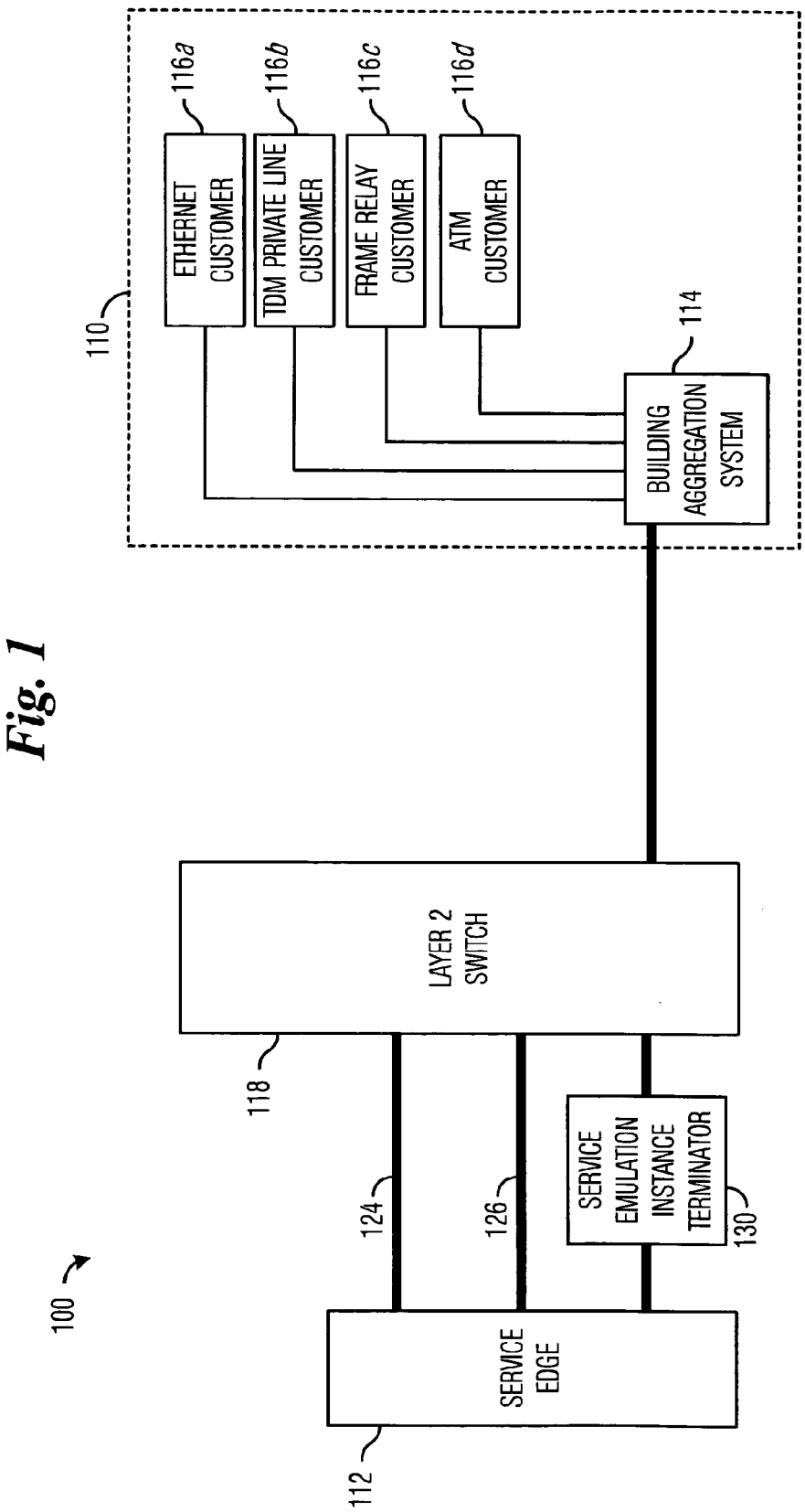
FIG. 1 is a network diagram in accordance with an embodiment of the present invention.

FIG. 1 is a network diagram in accordance with an embodiment of the present invention. FIG. 1 illustrates an access network 100 by which a customer site 110 is coupled to, and accesses the services of, a service edge 112. Generally, the service edge 112 represents the access points to a service provider's network, which may comprise one or more core networks (not shown). A core network may comprise, for example, a system of TDM switches, such as a network of Class 3 telephone switches. A core network may also comprise an ATM and/or a frame relay network covering much the same geographical territory as the TDM network. Moreover, a network of IP routers may also be supported in the core network. While these networks may overlap or cover much the same geographical territory, each are designed to efficiently carry particular types of traffic or exhibit particular properties that are amenable to certain types of traffic. Although this "multiplanar" network situation may frequently be encountered, it should be understood that the present invention may be equally applicable to a converged core network where native layer 2 handoff at the service edge is preferred. Service edge 112 is illustrated as a single network element for illustrative purposes only, and may actually include multiple network elements or multiple access interfaces having different capabilities.

By way of example, sources of different types of communications are depicted within customer site 110. One of the sources is Ethernet customer 116a coupled to a building aggregation system 114 over any form of connectivity amenable to Ethernet traffic, such as a 100BaseT, Gigabit Ethernet(GbE) or DSL connection. Another source of traffic may be private line customer 116b, which is coupled to the building aggregation system 114 via DS1 line. Source 116c represents frame relay customers having their frame relay traffic carried over TDM facilities such as DS1 lines to the building aggregation system 114. Asynchronous transfer mode (ATM) customer 116d represents ATM customers having their ATM cell traffic carried over TDM facilities such as DS1 lines to the building aggregation system 114. Other types of connections may be used as required to support specific customers' needs. Each of the CPE 116 may comprise one or more devices. For example, the Ethernet customer 116a typically includes a router communicatively coupled to other routers, hubs, user workstations, servers, or the like. The CPE 116a-116d are collectively referred to as CPE 116.

To provide connectivity toward service edge 112, the building aggregation system 114 is coupled to a layer 2 switch 118 via a communications link 113 such as a DS3 communications link or the like. The layer 2 switch 118 may provide switching and routing of traffic based upon information applied to the traffic, the information corresponding roughly to Layer 2 or the "data link layer" of the OSI Reference Model, and without having to examine the content of the customer data in the traffic.

An example of a building aggregation system 112 suitable for use with the present invention is disclosed in U.S. patent application Ser. No. 10/858,503, entitled "Method and Apparatus for Processing Labeled Flows in a Communications Access Network", which is incorporated herein by reference.

Communications link 113 communicatively coupling the building aggregation system 114 and the layer 2 switch 118 may be any suitable communications link, such as an optical fiber, optical ring, a gigabit Ethernet (GbE) connection, or the like. It is also worth noting that the layer 2 switch 118 may be coupled to a large number of customer sites 110 and building aggregation systems 114 to perform an intermediate aggregation and distribution function within the access network 100. The layer 2 switch 118 may also be coupled directly to the CPE 116.

In accordance with the present teachings, the building aggregation system 114, or some other network element, can be equipped to serve as one end of a plurality of carrier-tagged flows. A carrier-tagged flow represents a logical communications channel or flow established to carry carrier-tagged communications between two or more parties, or two or more points served by a communications system. The carrier-tagged communications can be voice, data, audio, video, or any other type of communications. A carrier-tagged flow may be implemented using a service emulation instance, such as a pseudowire as described in an IETF draft document entitled "draft-ietf-pwe3-arch-06.txt." This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as SONET/SDH or DSn signals. An Ethernet-based pseudowire may employ variable length packets even when carrying fixed-length cells or frames, such as 53-byte ATM cells. A pseudowire is typically implemented along a tunnel implemented in a packet-switched network. Some types of tunnels that may be suitable for carrying pseudowires, or even other types of communications that may be employed in conjunction with the present teachings, include Label Switched Paths(LSPs) according to the MultiProtocol Label Switching(MPLS) protocol, Layer 2 Tunneling Protocol(L2TP) tunnels, IPsec tunnels, etc.

Another example of a technique suitable for implementing a carrier-tagged flow is a logical networking tagged flow, such as a virtual local-area network (VLAN) or the like. A technique for achieving VLAN logical subnetworking is described in IEEE Standard 802.1Q. Briefly, a VLAN provides for designating and acting upon data packets in a manner that makes multiple LAN communication flows carried over a commonly shared communication path appear to be partitioned from one another as if traveling over separate, dedicated LAN connections. In accordance with an exemplary embodiment of the present teachings, a VLAN tagging approach may also be used for carrier-tagging of flows.

Carrier VLAN tags having significance for routing and processing in the access network may be used to encapsulate and tag customer flows. As they are encapsulated and/or tagged, customer flows may or may not already contain additional imbedded VLAN tags having significance within the customer's virtual network in accordance with typical 802.1Q usage. In accordance with the present teachings, the VLAN tagging approach may be reused for carrier-tagging purposes and may be locally significant on any port, with tag values possibly being replaced on a hop-by-hop basis.

In accordance with the present teachings, carrier tags applied to traffic to support handling of flows through an access network, whether in the form of tunnel labels, pseudowire labels, VLAN tags, etc., may be 'stackable' to any depth to support efficient flow management in the context of hierarchical aggregation and distribution between service edge(s) and customer locations.

Each carrier-tagged flow is identified by a carrier tag having a particular tag value. For example, a carrier-tagged flow implemented as a service emulation instance is identified by a service emulation instance mapping identifier. In the case in which a pseudowire is used as a service emulation instance, the service emulation instance mapping identifier may correspond to a pseudowire label. Carrier tags may be locally significant on any port and the tags can be swapped on a hop-by-hop basis as needed to provide a large number of flows using the finite number of identifier values that are available (approximately 1 million in the case of pseudowire labels). In this manner, switching in the access network can be simplified by encapsulating traffic in carrier-tagged flows and by interpreting and manipulating the corresponding carrier tags. The access network may transparently support a mixture of flow types and customer content, including any customer-specific addressing or virtual networking fields imbedded in the customer content. The pseudowire architecture, as promulgated by the Internet Engineering Task Force (IETF), provides one example of an approach involving encapsulation and labeling of traffic that may be adapted for use as a carrier-tagged flow. It should be noted, however, that other protocols may be used, and embodiments of the present invention may be implemented with other types of protocols and physical connections.

The building aggregation system 114 couples traffic of various types, such as traffic from the CPE 116a-116d, onto the appropriate corresponding carrier-tagged flows that have been established to emulate the type of transport suitable for each type of traffic. It should be noted that while in an embodiment the building aggregation system 114 serves as one end of the carrier-tagged flow, other embodiments may be implemented in which the CPE 116, the layer 2 switch 118, or some other intermediate device acts as one end of the carrier-tagged flow.

The building aggregation system 114 couples traffic of various types, such as traffic from the CPE 116a-116d, onto the appropriate corresponding carrier-tagged flows established for reaching the service edge. Where service emulation instances are used as carrier-tagged flows, a service emulation instance terminator 130 may serve as the other end of a number of service emulation instances which have originated at one ore more building aggregation systems 114 and passed through layer 2 switches 118. The service emulation instance terminator 130 switches or routes traffic from service emulation instances to a corresponding port and/or flow communicatively coupled to the service edge 112. The building aggregation system 114, layer 2 switch 118, service emulation instance terminator 130, and communications links therebetween may coordinate to simultaneously function as any of the various data-link layer transport types that may be required by customers, including ATM, frame relay, TDM, Ethernet/IP, and the like.

Alternatively, a service edge 112 may incorporate the functions of a service emulation instance terminator 130 or may otherwise be capable of directly accepting and processing carrier-tagged flows. In this case, a service edge 112 may be coupled more or less directly to layer 2 switch 118 and the communications to and from the service edge may bear flow-identifying carrier tags in the form of pseudowire labels, tunnel labels, VLAN tags or the like. Service emulation instance terminator 130 may nevertheless be useful in situations where an existing or legacy service edge lacks the ability to handle carrier-tagged access communications. As mentioned earlier, service edge 112 may actually represent several separate access points, perhaps to different types of core networks. Some access points within service edge 112 may be amenable to carrier-tagged flows whereas others may not be. Links 124 and 126 may represent links to TDM-capable ports on the service edge from TDM ports on layer 2 switch 118. It is also possible that, for example, one or both of these links may represent packetized data links and may even represent a service edge that is able to accept carrier-tagged flows, such as carrier-tagged pseudowires, directly without requiring service emulation instance terminator 130.

A service emulation terminator 130 suitable for use with the present invention is disclosed in U.S. patent application Ser. No. 10/858,491, entitled "Apparatus and Method for Terminating Service Emulation Instances", which is incorporated herein by reference.

In an exemplary embodiment, Ethernet may be utilized as the layer 2 protocol over which carrier-tagged communications are transmitted. The application of Ethernet in the access network can be based on TDM encapsulation, using X.86 or GFP, e.g. Ethernet over SONET (EoS). While Ethernet is desirable for supporting variable length packets, other protocols or frame formats may be used for the transport and processing of access communications.

In an implementation using service emulation instances, building aggregation system 114 may apply a unique service emulation instance mapping identifier to each of the flows from the CPE 116a-116d, and transmits the frames or packets bearing the traffic and service emulation instance mapping identifiers to the layer 2 switch 118. Similarly, the building aggregation system 114 may receive data associated with a service emulation instance identifier from the layer 2 switch 118 and converts the data to a format compatible with the corresponding CPE 116.

In operation, the building aggregation system 114 receives Ethernet traffic from Ethernet customer 116a via the building "riser." The building aggregation system 114 receives this traffic along a port that is known to correspond to Ethernet customer 116a and maintains an association between the customer's port and Ethernet traffic stream and a corresponding carrier-tagged flow. Likewise, at the other end of the carrier-tagged flow, the service emulation instance terminator 130, the layer 2 switch, or some other network element delivers the customer's traffic to the service edge 112 and may coordinate with the service edge 112, such as by mapping of port numbers or directing of flows, to ensure that the network identifies the customer's traffic as such and appropriately handles the traffic.

To establish or modify a customer's carrier-tagged flow between the CPE 116 and the service edge 112, the customer may indicate to the network service provider the desire to establish communications in a particular manner. This request may be submitted either manually or automatically through a user network interface (UNI). As will be described in greater detail below, the establishment of communications through the access network shown may originate in a variety of ways. To coordinate fulfillment of an access communications request, a network management system, provisioning function, or the like, may dispatch provisioning and configuration instructions to the building aggregation system 114, the layer 2 switch 118, the service emulation instance terminator 130, or other network elements. To some degree, these elements may perform some functions autonomously or may coordinate with one another to fulfill requests.

While some aggregation can be provided by the building aggregation system 112, the layer 2 switch 118 may also provide further aggregation or first-level aggregation of some flows. For example, the layer 2 switch 118 may be communicatively coupled to legacy systems not equipped with the aggregation services of the building aggregation system 112. In these situations, the layer 2 switch 118 may be configured to provide the ability to accept various inputs from varying types of CPE 116 and to aggregate the traffic onto one or more logical pipes. As another example, the layer 2 switch 118 may aggregate traffic from multiple customer sites 110, building aggregation systems 112, and other layer 2 switches.

Figure 2:
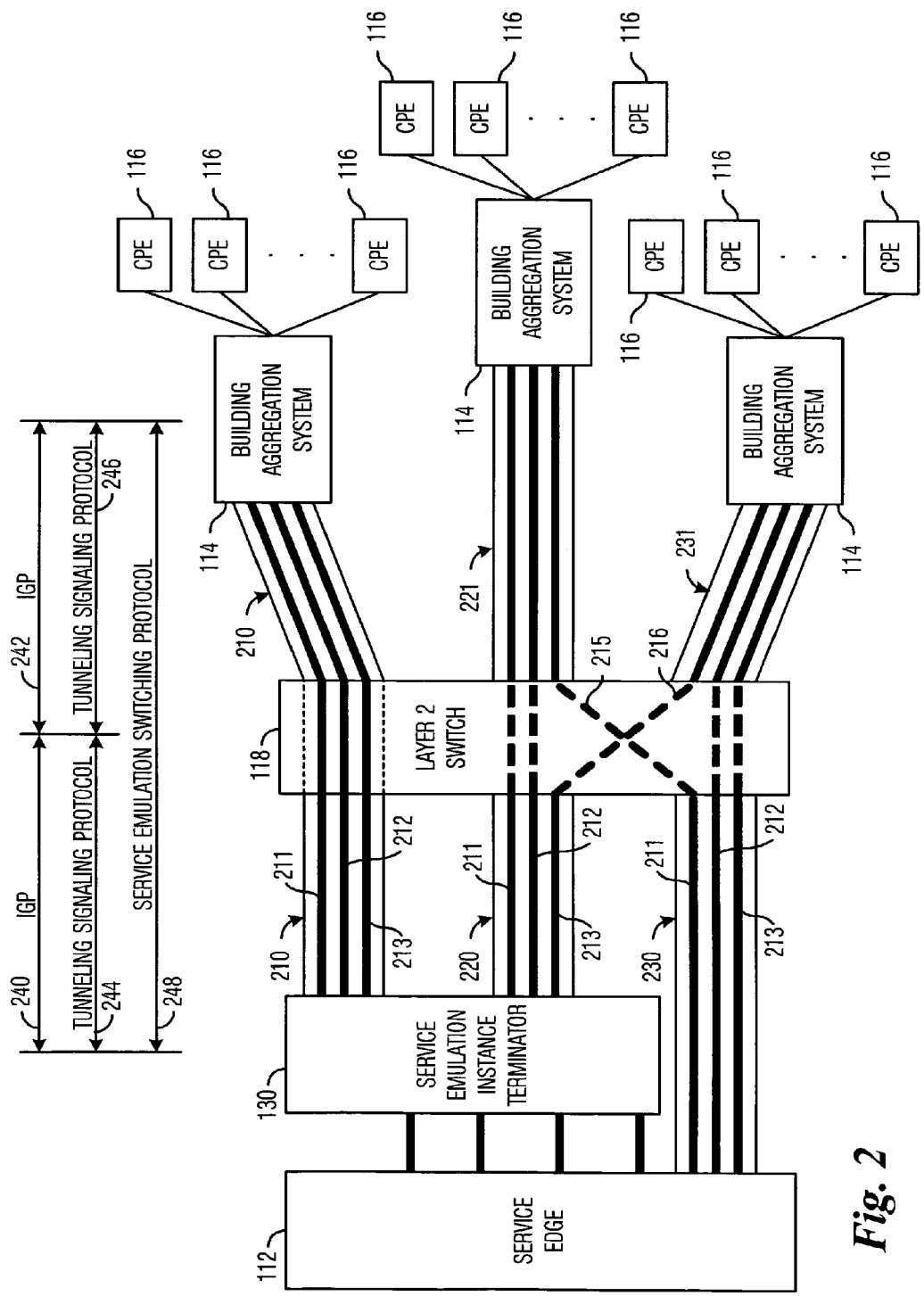
FIG. 2 is logical view of service emulation instances in accordance with an embodiment of the present invention.

FIG. 2 is a logical view of a carrier-tagged flow in accordance with an embodiment of the present invention. As described before, one purpose of an access network is to efficiently and flexibly couple customer sites (represented by building aggregation systems 114 communicatively coupled to the CPE 116) to the edge of a service provider's network represented by the service edge 112. The layer 2 switch 118 is shown as an intermediary and may participate in grooming, aggregating and directing communications traffic in the access network, as well as performing crossover switching between TDM ports and packet-oriented ports. Note that FIG. 2 illustrates two-hop paths, although it is possible that there are some intervening transmission elements or other layer 2 switches 118 along the access coupling.

In FIG. 2, multi-protocol label switching (MPLS) label switched paths (LSPs) 210, 220, 221, 230, and 231 are shown to have been established between various building aggregation systems 114 and the service edge 112 for illustrative purposes. Each LSP corresponds to a pathway or a means of forwarding traffic from the building aggregation system 114 to the service edge 112 and may comprise one or more carrier-tagged flows, e.g., carrier-tagged flows 211, 212, and 213, that may carry traffic based upon a carrier tag prepended to the traffic and a mutual understanding among the network elements as to how to handle traffic having a specific tag value.

Each LSP may accommodate one or more service emulation instances and each service emulation instance can be of a specific type. By virtue of VLAN "stacking" and having different layer 2 addresses present in the traffic that may be encapsulated, each service emulation instance 211, 212, 213 may carry multiple customer-specified flows. This behavior can be controlled by the customer and can be transparent to the access network 100. In accordance with the present teachings, the access network may be unconcerned with anything but the outermost labels or carrier tags applied for access network purposes, such as tunnel labels or service emulation instance mapping identifiers applied to the traffic.

Label switched path 210 represents one embodiment of the present invention in which the label switched path is routed via a tunnel label. In other words, each unit of traffic (frame, packet, etc.) is tagged with a tunnel label and elements use the tunnel label to determine how to process and where to send the traffic. In this situation, each service emulation instance within the tunnel identified by the tunnel label, e.g., label switched path 210, is routed or switched in the same manner, as illustrated by the dotted label switched path line and the solid service emulation instance lines through the layer 2 switch 118. Layer 2 switch 118 may efficiently switch traffic among its ports by observing and acting upon the tunnel label present in the traffic. In an alternative embodiment, the service emulation instance may be routed or switched based upon a service emulation instance mapping identifier. In this situation, the label switched paths are established between the various building aggregation systems 114 and the layer 2 switch 118 and between the layer 2 switch 118 and the service edge 112. Where tunnels are established on a hop-by-hop basis, such as tunnel 231 between building aggregation systems 114 and the layer 2 switch 118, tunnel labels may be optional and switching within layer 2 switch 118 may be based upon a service emulation instance mapping identifier present in the traffic as just described.

For example, reference numerals 220 and 230 indicate label switched paths established between the layer 2 switch 118 and the service emulation instance terminator 130, and reference numerals 221 and 231 indicate label switched paths established between various building aggregation systems 114 and the layer 2 switch 118. As indicated by the dotted service emulation instance lines 215 and 216, each of the service emulation instances within label switched paths 220, 221, 230, and 231 may be routed or switched independently of each other as they pass through layer 2 switch 118. The tunnel label and service emulation instance mapping identifier are discussed in greater detail below with reference to FIG. 5.

As depicted by reference numeral 248, a label selection or service emulation switching protocol, such as the Label Distribution Protocol (LDP), may be exercised among the service emulation instance/LSP endpoints, namely the building aggregation system 114 and the service emulation instance terminator 130. Reference numerals 240 and 242 represent the choice of routing between the building aggregation system 114 and the layer 2 switch 118 and between the layer 2 switch 118 and the service emulation instance terminator 130. Identifying and selecting the appropriate paths through the access network may be accomplished using an interior gateway protocol (IGP) such as the Open Shortest Path First-Traffic Engineered (OSPF-TE) approach as described in Internet Engineering Task Force's (IETF's) Request For Comments (RFCs) 2328, 2676, et al., which are incorporated herein by reference. Other routing protocols are known and may be used.

Reference numerals 244 and 246 indicate that a tunneling signaling protocol, such as the Resource Reservation Protocol (RSVP), may also be used in conjunction with other techniques during establishment of the label switched paths so that the elements involved along the path commit to allocating a specific quantity of bandwidth and other resources to support the requested flow and its performance requirements. Alternatively, it is possible to establish static LSPs wherein little or no signaling is required.

Multiprotocol label switching (MPLS) is described in documents IETF's RFCs 3031, 2702, et al. maintained by the Internet Engineering Task Force (IETF), which are incorporated herein by reference. Related to the negotiation of labels that are used in MPLS, the label distribution protocol (LDP) is described in IETF's RFC 3036, which is also incorporated herein by reference. The label distribution protocol is also discussed in IETF's Draft entitled "draft-ietf-pwe3-control-protocol-06.txt." The use of RSVP, MPLS and LDP are shown by way of example only and should not be construed as limiting the ways in which the present invention may be implemented.

FIG. 2 is provided as a logical view and various physical implementations may be used. For example, each of the label switched paths 210, 220, 221, 230 and 231 may be transported over one or more communications links. It should also be noted that certain of the flows 211, 212, and 213 are illustrated as remaining together within each of the labeled switched paths for illustrative purposes only. Upon reaching a switching point, such as layer 2 switch 118, at the terminus of a tunnel, such as label switched path 221, each flow through the access network may be switched independently based upon, among other things, the type of service being provided, the requested service edge, one or more aspects of the traffic, and the like. This switching possibility is depicted by dashed lines 215 and 216 in FIG. 2.

Once the service emulation instance is established, the building aggregation system 114 maintains an association between the service emulation instance mapping identifier and the port and/or virtual circuit through which the customer's traffic is received. Thus, as traffic is received along this port, it is coupled to the correct service emulation instance that has been established. For example, the traffic from CPE 116a-116d enter through respective ports of the building aggregation system 114 and are coupled onto suitably configured service emulation instances.

In practice, the frame relay traffic from the CPE 116c, although passing through DS1 lines in the building riser, may be extracted as frame relay frames by the building aggregation system 114 and coupled into FR-type service emulation instances. This is more efficient than passing the FR-laden DS1 communications through a service emulation instance. The DS1 circuit would unnecessarily reserve a constant bandwidth at all times whereas carrying the frame relay traffic allows for multiplex gains, including statistical multiplexing.

The service emulation instance terminator 130 may terminate a large number of service emulation instances that have originated from one or more building aggregation systems 114. The service emulation instance terminator 130 may be viewed as "front ending" the service edge 112. At the service emulation instance terminator 130, the various service emulation instances are terminated and the traffic carried through each service emulation instance is recovered and passed to the service edge 112 appropriate for the type of traffic. Typically, frame relay traffic arriving through a service emulation instance is to be passed along to a frame relay core network, if there is one. Likewise, TDM traffic should be passed along to a TDM network, and Ethernet or IP traffic should be passed along to the packet-switched service network in the core. However, one type of transport may be carried over another, for example, to carry IP traffic over a SONET TDM core network. Consequently, the service emulation instance terminator 130 may also provide interworking or adaptation so that frame relay traffic that arrives through a service emulation instance may be passed along to an Ethernet-based service edge element for transport over something other than an end-to-end frame relay network.

For convenience, the operation of exemplary embodiments of the present invention discussed herein are described in terms of traffic flowing from the CPE 116 to the service edge 112. However, it should be noted that the same techniques discussed herein also handle traffic leaving the service edge and being distributed to an appropriate customer endpoint. Every element may serve a complementary role related to the direction of flow. The service emulation instance terminator 130 receives aggregated flows from the service edge 112 and sends the traffic to a layer 2 switch 118 over a communications link, but it also receives traffic from a layer 2 switch 118 over the communications link and distributes the traffic to the appropriate service edge 112. The layer 2 switch 118 and the building aggregation system 114 may also operate bi-directionally. The service emulation instance terminator 130 may also perform aggregation services to aggregate flows from a plurality of service edges to one or more flows to be transmitted to the building aggregation system 114. It is also worth mentioning that some traffic through an access network may be from one customer location to another in a given vicinity and may not necessarily be destined for a service edge. Many of the techniques described for traffic between a customer location and a service edge would be applicable to this situation as well.

The bi-directionality of some traffic may have implications for the establishment of pseudowires if MPLS tunnels or the like are utilized. For example, where an RSVP/LDP mechanism is used to establish label switched paths, a bi-directional link may require initiating the formation of a service emulation tunnel in one direction, originating at the building aggregation, and forming the corresponding service emulation tunnel in the reverse direction by originating an RSVP request from the service emulation instance terminator 130. These service emulation tunnels will be independently formed, may have different QoS requirements, and may take different routes between the building aggregation system 114 and the service emulation instance terminator 130.

Figure 3:
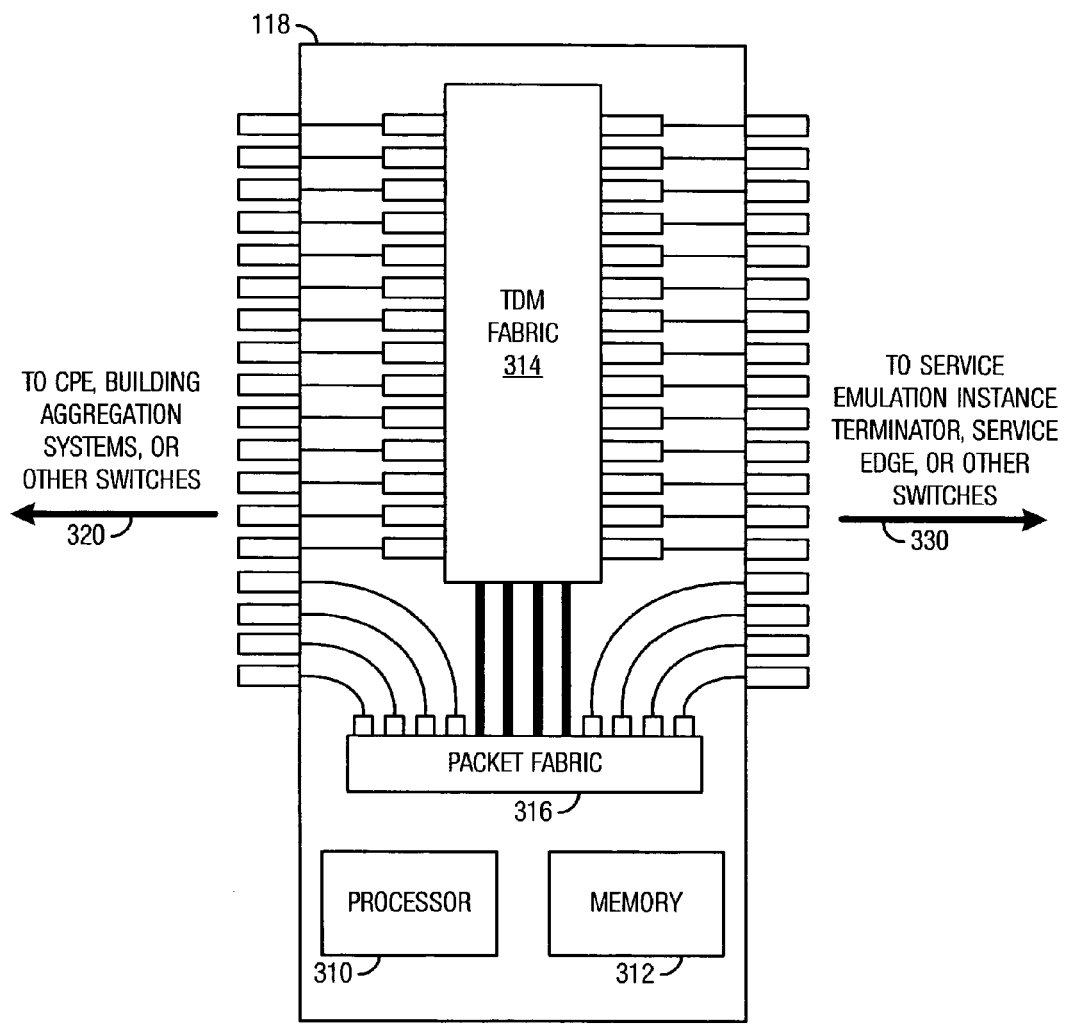
FIG. 3 is a block diagram including an exemplary embodiment of a layer 2 switch that may be used in accordance with an embodiment of the present invention.

FIG. 3 is a block diagram including an exemplary embodiment of a layer 2 switch that may be used in accordance with an embodiment of the present invention. The layer 2 switch 118 comprises a processor 310, memory 312, a TDM fabric 314, and a packet fabric 316. Generally, the processor 310 with the memory 312 provides the processing capabilities to provide switching/routing instructions, provisioning, maintenance, and control functionality. The TDM fabric 314 provides the ability to switch or route TDM traffic, and the packet fabric 316 provides the ability to switch or route packetized traffic.

The layer 2 switch 118 includes CPE-side ports 320 and service-edge-side ports 330, each of which may support multiple types of connections and protocols. In an embodiment of the present invention, any port could face either CPE or service edge, on a port-by-port basis. The CPE-side ports 320 may communicatively couple to CPE, or equipment communicatively coupled between the CPE 116 and the layer 2 switch 118. The equipment on the CPE-side of the layer 2 switch 118 may include, for example, CPE 116, the building aggregation system 112, another switch, routers, hubs, add/drop multiplexers, or the like. In contrast, the service-edge-side ports 330 are communicatively coupled to the service edge 114 or equipment communicatively coupled between the layer 2 switch 118 and the service edge 114. For example, network elements that may communicatively couple to the service edge side ports may include the service edge 114, the service emulation terminators 130, another switch, routers, hubs, multiplexers, or the like.

The CPE-side ports 320 and service-edge-side ports 330 provide connectivity for TDM traffic and packetized traffic. TDM traffic can be received via one or more optical communications links that support high-speed, high-volume traffic, such as, for example, an OC-12, OC-48, OC-192, or the like. Other communications links, such as T1 or DS3 signals over electrical, optical or wireless connections, may also be used. Packet traffic can be received via, for example, one or more GbE or 10 GbE communications links. The TDM traffic may comprise packets transmitted via a TDM transport, and the packet data may comprise TDM data transmitted via a packet transport.

It should be noted that the TDM fabric 314 and the packet fabric 316 can be interconnected, via TDM/packet conversion framers as described later, thereby allowing incoming TDM traffic to be routed to an outgoing TDM port or an outgoing packet port. Similarly, incoming packet traffic may be routed to an outgoing packet port or an outgoing TDM port. The need to port traffic across TDM and packet fabrics may arise from several practical scenarios. In one situation, a customer site may be coupled to the layer 2 switch through a TDM (T1, DS3) connection over which packetized data may be sent, using X.86 or GFP, for example. Consequently, although the base transport is TDM, the traffic may actually represent a packetized flow that is appropriate to be aggregated with other packet data flows and forwarded to a service edge as such. (In this scenario, it is also possible that the packetized flow, in turn, carries or emulates a TDM circuit, resulting in a protocol stacking of TDM-over-packet-over-TDM.) In another situation, some of the packetized traffic from a customer received along a packet connection may need to go to a TDM-oriented service edge. Either of these situations requiring TDM/packet crossover may be the subject of flow management or provisioning control implemented within, or externally directed to, layer 2 switch 118.

The use of two separate fabrics depicted in FIG. 3 is only one example implementation. In an alternative implementation, layer 2 switch 118 may employ a single switching fabric in conjunction with port cards, or functions at each port, which convert the various types of communication into a unified format compatible with the switch fabric. The present invention is not limited to either of these proposed designs or from being implemented in yet another way.

Figure 4:
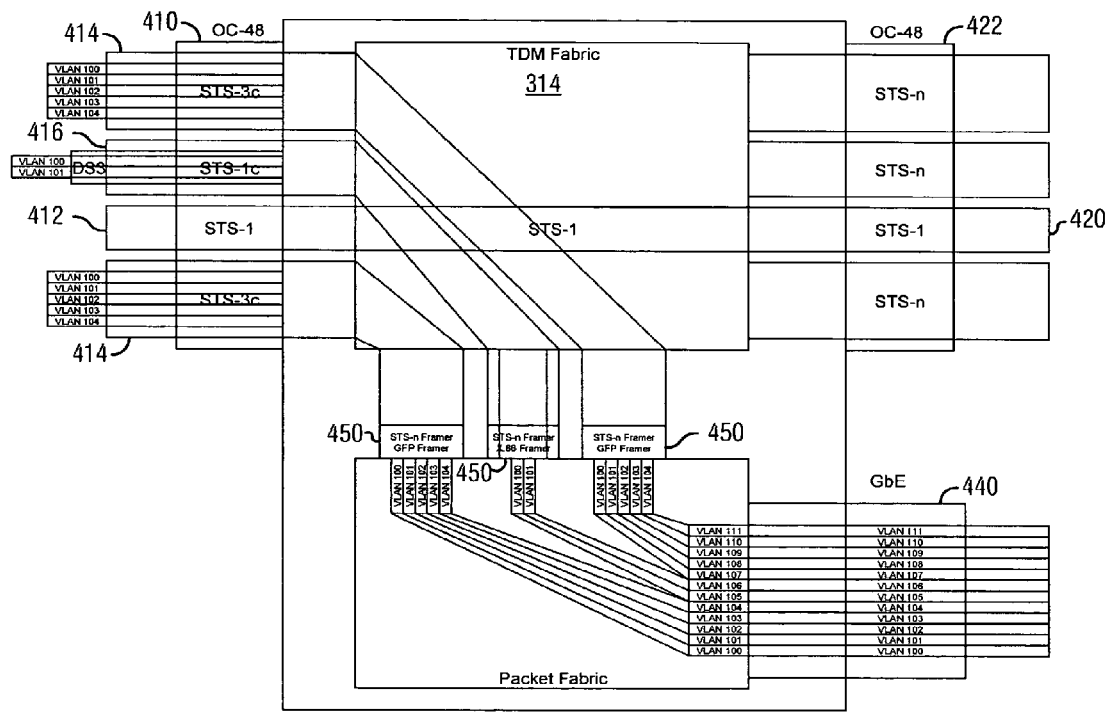
FIG. 4 is a diagram illustrating the switching function of layer 2 switches in accordance with an embodiment of the present invention.

FIG. 4 is a diagram illustrating the switching function of layer 2 switches in accordance with an embodiment of the present invention. It should be noted that FIG. 4 illustrates an embodiment in which VLANs are utilized as a form of carrier-tagged flow. As discussed above, other mechanisms, such as pseudowires or the like, may be used, with switching behavior then being based upon interpretation and manipulation of pseudowire labels, tunnel labels, etc. A flow requiring such crossover may be identified by having a particular carrier-tag value and, accordingly, it may be said that the routing of the frames of a flow from packet to TDM or vice versa may be determined based upon the value of one or more carrier tags within the traffic-bearing frames.

Illustrated is an incoming OC-48 optical carrier 410 comprising an STS-1 line signal 412, a first STS-3c line signal 414, an STS-1c line signal 416, and a second STS-3c line signal 418. The STS-1 line signal 412 is routed via the TDM fabric 314 to an outgoing STS-1 line signal 420 on an outgoing OC-48 optical link 422.

Traffic on the other line signals, e.g., the first STS-3c line signal 414, the STS-1c line signal 416, and the second STS-3c line signal 418, are shown to be routed by the TDM fabric 314 to the packet fabric 316. The packet fabric 316, based upon the carrier tag, routes the traffic to a packet-based communications link, such as the GbE link 440. It should be noted that traffic routed between the TDM fabric and the packet fabric may require a framer 450 to format the traffic appropriately for the associated transport. Generally, the framers 450 extract the payload from the STS-n Synchronous Payload Envelope (SPE) and decapsulate the X.86 or GFP packet (and the reverse), presenting the Layer 2, labeled packet to the switch function for routing.

FIG. 4 also illustrates an embodiment in which, when VLANs are utilized to implement a carrier-tagged flow, VLAN identifiers are locally significant at each interface and may be changed on a hop-by-hop basis. For example, each of the first STS-3c line signal 414, the STS-1c line signal 416, and the second STS-3c line signal 418 have a VLAN utilizing VLAN identifier 100. The packet fabric 316 aggregates the VLANs from each of the first STS-3c line signal 414, the STS-1c line signal 416, and the second STS-3c line signal 418 for transport across a single GbE communications link 440. In the course of being routed to link 440, some flows that entered along optical carrier 410 will undergo a change of VLAN identifiers to assure uniqueness at the outbound interface. For example, the 'VLAN 100' flows indicated within line signals 414, 416 and 418 will have to be reassigned distinguishable new values as shown.

Of course, some coordination among network elements and management of data in one or more management information bases will assure that when traffic tagged with VLAN value 100 is received elsewhere, it will be understood that this represents the flow that was introduced within line signal 414 having a VLAN tag value of '100'. As an alternative to changing the existing VLAN carrier tags in this manner, it may be desirable to simply stack an additional VLAN tag structure onto the traffic to achieve the required uniqueness. This outermost VLAN tag may then be stripped off or 'popped' when the aggregated flows reach a point where they will be separated again, such as at a service edge. A manner in which VLAN tags may be stacked is sometimes known as "Q-in-Q", referring to application of principles in IEEE Standard 802.1Q. This approach also requires some coordination among elements involved in routing and terminating the flows.

Figure 5:
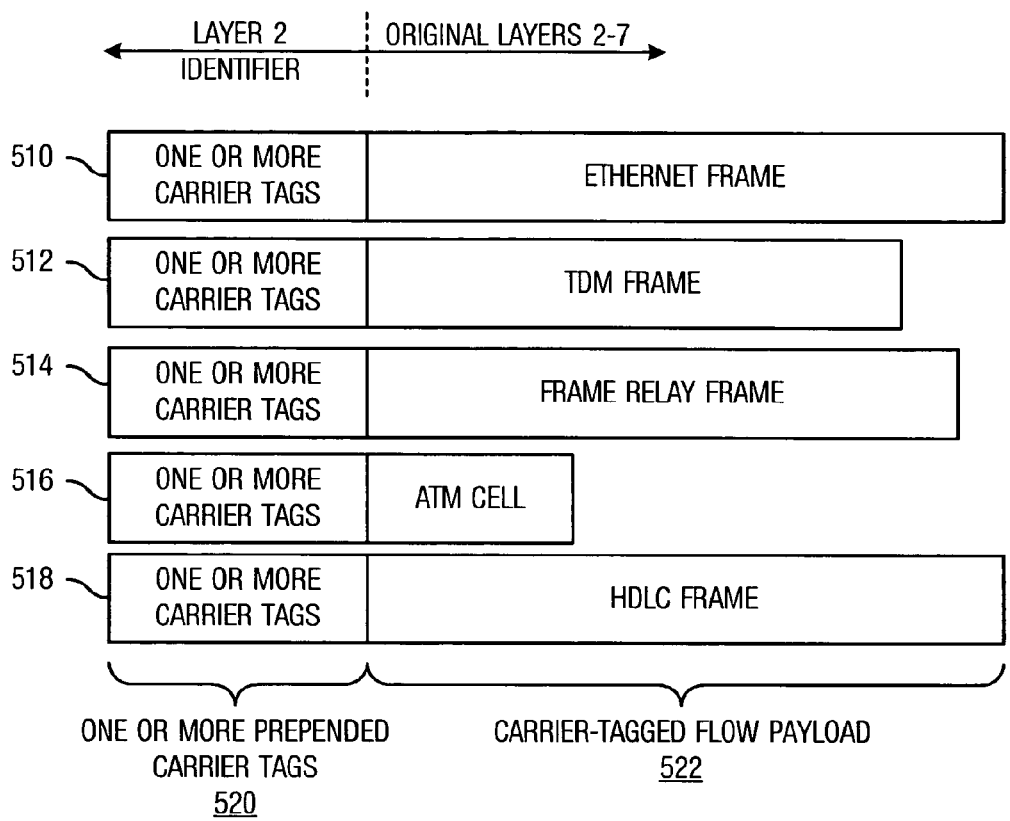
FIG. 5 is a diagram illustrating the use of service emulation in accordance with an embodiment of the present invention.

FIG. 5 illustrates examples of data messages or frames that may be transmitted into the access network, or received from the access network, by the building aggregation system 114 in accordance with an exemplary embodiment of the present invention. Each of messages 510-518 have two portions: a carrier-tagged flow payload 522 and one or more prepended carrier tags 520. The carrier-tagged flow payload 522 represents, for example, the information as it is received from customer premise equipment at the customer site. The different types of messages shown correspond to various formats associated with a particular type of CPE interface, such as, for example, an Ethernet frame message 510, a TDM frame message 512, a frame relay frame message 514, an ATM cell message 516, or the like. Other messages, such as a high-level data link control (HDLC) frame 518, an ATM application adaptation layer 5 (AAL5) protocol data unit (PDU), or the like, may also be used. In general, the messages will usually carry various types of customer data corresponding to layers 2-7 of the OSI Reference Model.

As FIG. 5 shows, each message type may be tagged and processed in a uniform manner by the addition of one or more carrier tags. FIG. 5 reflects the format of composite messages that are sent between a building aggregation system 114, a service edge 112 and any other intervening elements. As illustrated in FIG. 5, the carrier-tagged flow payload 522 is kept substantially intact and a carrier tag 520 is prepended to the carrier-tagged flow payload 522 to prepare it for transmission through the access network. Depending on implementation, the carrier tag 520 may comprise, for example, a pseudowire label, a VLAN identifier, a tunnel label or the like. Multiple carrier tags may be stacked within a message or frame to provide for a hierarchical aggregation and routing mechanism to be implemented in the access network.

It is particularly noteworthy in FIG. 5 that, regardless of message type, all of the carrier tags 520 may be of uniform format. (In the case of tunnel labels, for example, messages of different types may even have the same tag value if they happen to be routed commonly.) The use of a uniform carrier tag format for all message types makes it possible for simple, generic handling of all traffic types through the access network using a uniform set of network elements that process traffic based on carrier tags. The switching elements within the access network may simply inspect the carrier tag(s) 520 of messages to determine how the message should be switched or routed without regard to message type or contents. In this manner, the access network becomes "service agnostic" and does not have to be concerned with the specifics of the protocols or addressing imbedded in the customer traffic. The generic nature of the carrier tag also allows for readily supporting any other message types not shown in FIG. 5, with little or no changes being required in the design and operation of the layer 2 switches 118 or other elements.

In some implementations, it may be desirable to prepend one or more tunnel labels (not shown) to the messages 510-518. A tunnel label allows a tunnel to be established throughout the access network, such as between a building aggregator and a service edge, improving scalability in the network. This mechanism may be particularly useful when many service emulation instances are to be routed to the same destination or service edge. By assigning the service emulation instances to a common tunnel, network elements, such as the layer 2 switch 118, may collectively route the service emulation instances within the tunnel by evaluating the tunnel label. In an exemplary embodiment, the tunnel label is an LSP label prepended to the messages 510-518. In accordance with the present teachings, tunnel labels may also be stacked to any degree needed to support a tunneling hierarchy, which may further facilitate efficient and scalable management of large numbers of flows.

Although the carrier-tagged flow payload 522 is shown and described as being kept essentially intact, it may be desirable in some situations to modify this original message. For example, the original message portion 522 of the Ethernet frame message 510 and the frame relay frame 514 frequently includes a frame check sequence (FCS). In many networks, the FCS is not used and may be removed. In other cases, the Ethernet frame check sequence (FCS) as received in the Ethernet frame may optionally be included, as is, rather than being deleted or recalculated by the building aggregation system 114. This can be advantageous for detecting errors or corruption of the data that might occur as the customer payload traverses the network.

Figure 6:
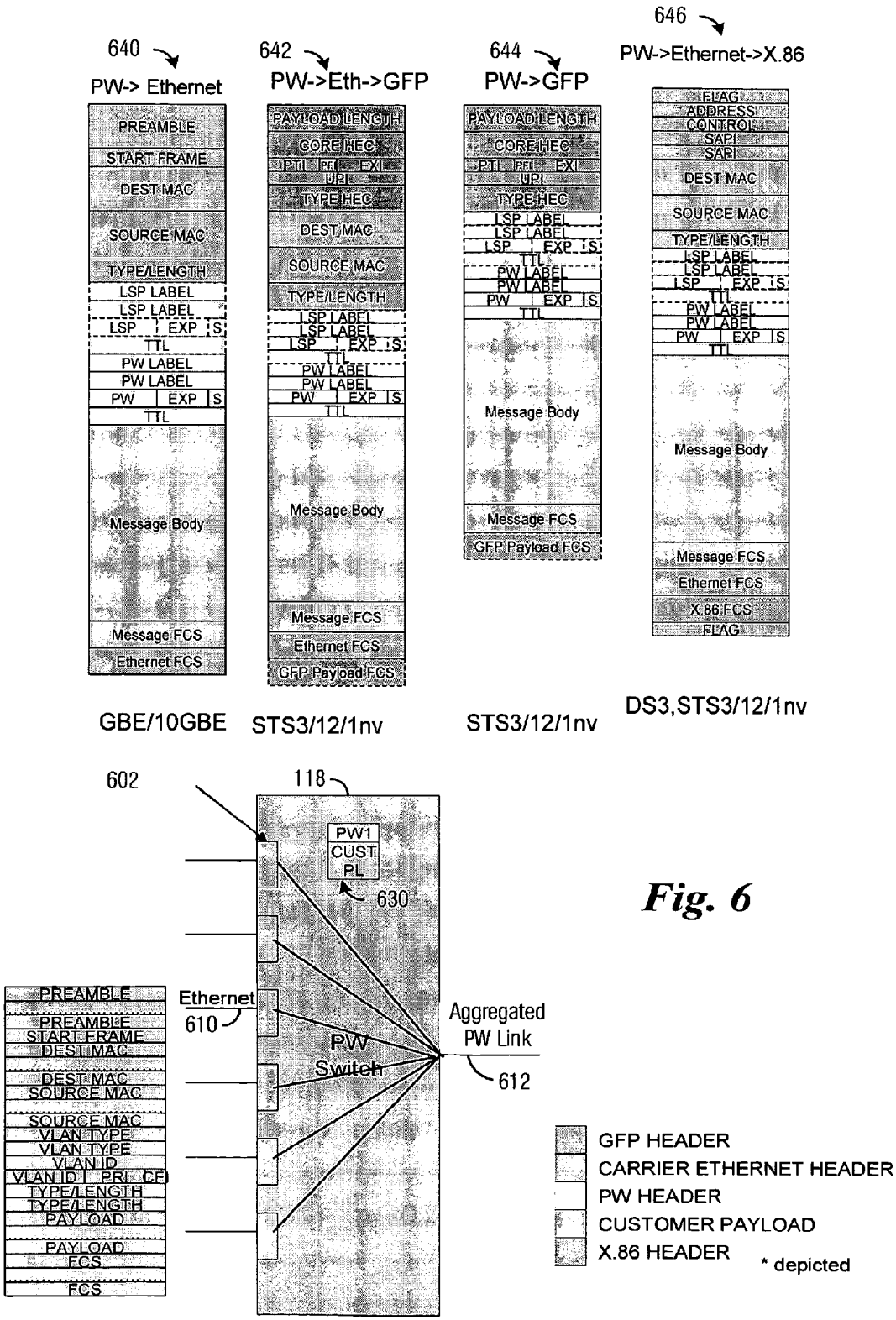
FIG. 6 illustrates framing formats in accordance with an embodiment of the present invention.

FIG. 6 illustrates framing formats in accordance with an exemplary embodiment of the present invention. It should be noted that FIG. 6 illustrates an embodiment in which pseudowires are utilized as the carrier-tagged flow. Other methods and apparatuses may be used. An encapsulation function 602 receives customer payload information and encapsulates the customer payload by prepending a carrier tag, as discussed above with reference to FIG. 5, and other carrier header information. It should be noted that, in some networks, the traffic received by the layer 2 switch 118 may already be encapsulated. In these situations, the layer 2 switch 118 may not need to perform an encapsulation function 602, and may simply switch or route the traffic based upon the carrier tag already present.

For example, in FIG. 6 the layer 2 switch 118 routes traffic between an Ethernet communications link 610 (which may be communicatively coupled to CPE) and an aggregated pseudowire communications link 612. The layer 2 switch 118 receives a flow in the form of Ethernet frames, each frame including Ethernet header information and customer payload information. The layer 2 switch 118 prepends a pseudowire label to the Ethernet frame as indicated by the encapsulated message 630. It should be noted that the Ethernet frame received may be left substantially unmodified, and the pseudowire label, and other encapsulating information, is placed around the received Ethernet frame. It should also be noted that the Ethernet frame check sequence (FCS) as received in the Ethernet frame may optionally be included as is rather than being deleted or recalculated by the layer 2 switch 118.

Multiple flows may be aggregated and carried along the aggregated pseudowire communications link 612. Traffic in the aggregated pseudowire communications link 612 may appear in different forms dependent upon the transport mechanism used to transport the aggregated link. In one embodiment, the pseudowire flows are transmitted via an Ethernet interface as indicated by reference numeral 640. In this embodiment, the pseudowire frame is encapsulated in an Ethernet frame, including a new Ethernet FCS. It should be noted that the original Ethernet FCS may be retained and not affected by the calculation of the new Ethernet FCS. Thereafter, the aggregate link may be transmitted on the Ethernet interface.

In another embodiment, the aggregated pseudowire communications link 612 is transmitted on a SONET/TDM interface, such as, for example, an STS-3/12/1nv communications link, wherein the pseudowire frame is encapsulated in an Ethernet frame and a GFP frame, as indicated by reference numeral 642. In this embodiment, an Ethernet frame is wrapped around the pseudowire frame, optionally prepended with a LSP label and then encapsulated into a GFP frame. The original FCS may be unmodified, and a new FCS value is calculated for the new Ethernet frame.

In yet another embodiment, the aggregated pseudowire communications link 612 is transmitted on a SONET/TDM interface, such as, for example, an STS-3/12/1nv communications link, wherein the pseudowire frame is encapsulated in a GFP frame, as indicated by reference numeral 644. In this embodiment, a GFP frame is wrapped around the pseudowire frame. The original FCS may be unmodified, and a new FCS value is calculated for the new Ethernet frame.

In yet another embodiment, the aggregated pseudowire communications link 612 is transmitted on a SONET/TDM interface, such as, for example, a DS3, an STS-3/12/1nv communications link, or the like, using X.86, as indicated by reference numeral 646. Similar to the other embodiments, this embodiment wraps an Ethernet frame around the pseudowire frame, and then encapsulates the new Ethernet frame into an X.86 frame. The original FCS is unmodified and new FCS values are added for the Ethernet and X.86 framing. Additional flags may be added as appropriate. Other protocols, framing techniques, and transports may be used.

In any of the frames depicted by reference numerals 640-646, multiple carrier tag portions, such as the LSP labels or pseudowire labels, may appear within each frame to represent nesting of tunnels or nested encapsulations. Referring briefly back to FIG. 2, this would correspond to the situation in which, for example, a single large tunnel between layer 2 switch 118 and service emulation instance terminator 130 might be used to encompass all of the flows within label switched paths 210 and 220. Traffic in LSP 210 may receive an additional outer tunnel label as it passes through layer 2 switch 118. The nesting of tunnels may become more useful as an increasing number of aggregation stages and routing hops are applied in the access network.

In FIG. 6, the message body and message FCS portions depicted in frames 640 through 646 may constitute a payload of the carrier-tagged frame whereas the remainder of the frame may be referred to as "encapsulation structure" added to the payload. The carrier-applied labels added as a part of this encapsulation are shown in these examples as LSP labels and PW (pseudowire) labels, although any other type of structures could be used. As described above, multiple ones of the carrier tags, namely multiple LSP labels and/or PW labels, may be present in a frame. In some implementations, the addition of carrier tags to a payload or message body may be all the encapsulation that is performed. Otherwise, as exemplified in FIG. 6, the carrier tags, and specifically the carrier tag values themselves, may be part of a larger encapsulation structure which may include other fields, addresses, delimiters and such. Carrier tags may be arranged in any manner. A carrier tag structure may or may not comprise other fields in addition to the actual carrier tag values which identify single or aggregate flows, such as tunnel labels, service emulation instance mapping identifiers, pseudowire labels, etc.

Figure 7:
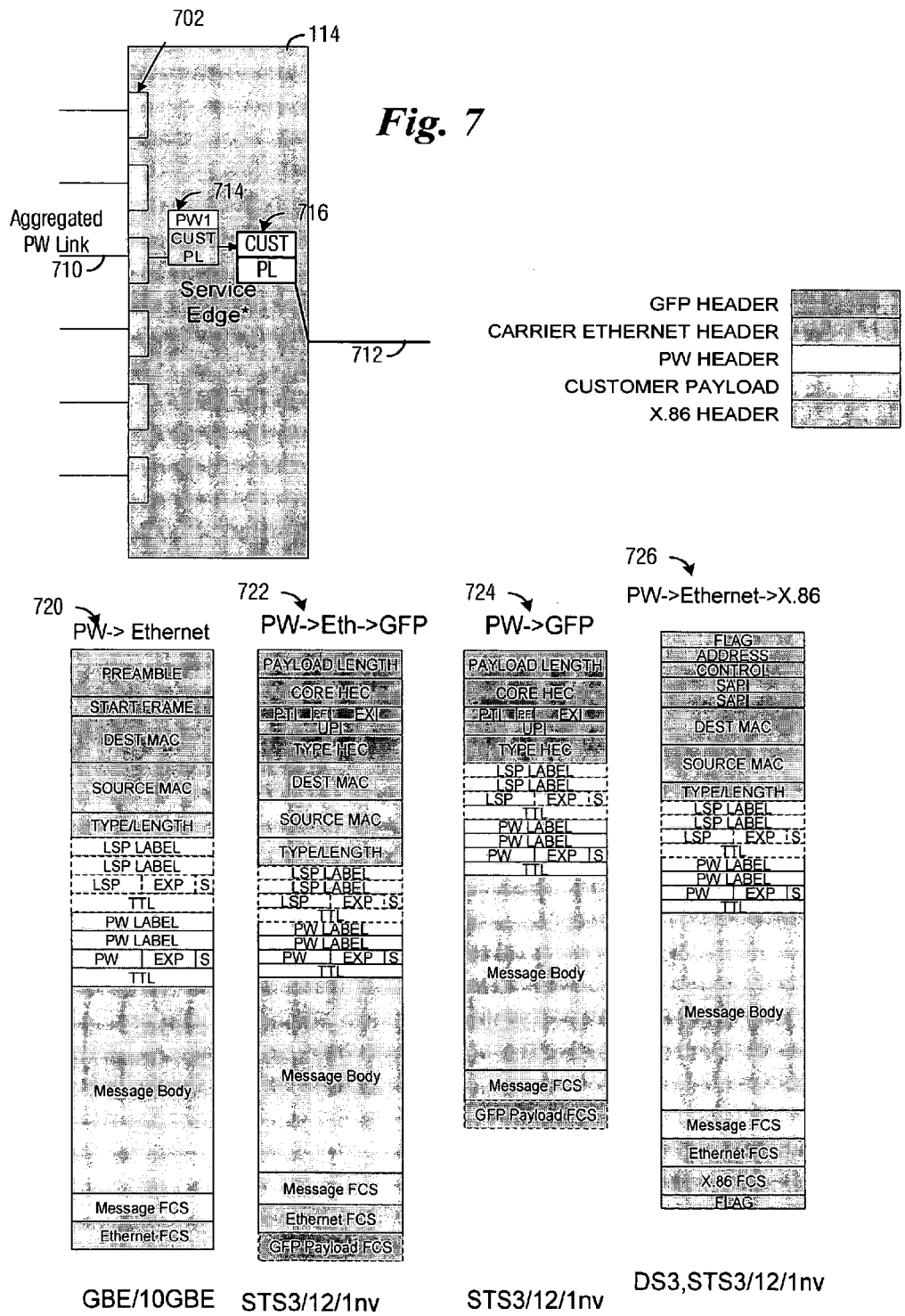
FIG. 7 illustrates framing formats in accordance with an embodiment of the present invention.

FIG. 7 illustrates framing formats in accordance with an embodiment of the present invention. In one embodiment, aggregated pseudowire flows 710 are the flows transmitted by the layer 2 switch 118 as discussed above with reference to FIG. 6. In this situation, a decapsulation function 702 may be performed by the service edge 114 or the service emulation terminator 130. In an environment in which the service edge 114 is incapable of or not configured for performing the decapsulation function 702, the layer 2 switch 118 may perform the decapsulation function 702 and substitutes another sub-interface encapsulation, such as, for example, a VLAN over a TDM or GbE interface, or the like, before forwarding the traffic to the service edge. In another situation, the access network may comprise two or more layer 2 switches interconnected. In this situation, the last layer 2 switch may decapsulate the traffic prior to passing the traffic to the service edge.

The Ethernet, Ethernet/GFP, GFP, and Ethernet/X.86 frames, represented by reference numerals 720, 722, 724, and 726, respectively, correspond to the frames 640, 642, 644, and 646, respectively, discussed above with reference to FIG. 6. Upon receipt of the aggregated pseudowire flows 710, a decapsulation function 702 is performed. The decapsulation function 702 removes the header, the FCS, and other flags that may have been added during the encapsulation function related to the framing and performs error checking/frame verification procedures. As indicated by reference numeral 714, a decapsulated flow includes a pseudowire label and the customer payload. The pseudowire label may be removed resulting in a customer payload 716 as originally received by the access network.

It should be noted that the decapsulation function 702 is illustrated as being performed by the service edge 114 for illustrative purposes only and that the decapsulation function 702 may be performed by other components. For example, in one embodiment, multiple layer 2 switches may be communicatively coupled together and the service edge 114 may not be configured to perform the decapsulation function 702. In this scenario, the layer 2 switch 118 may perform the decapsulation function before forwarding the flow to the service edge 114. In another example, a service emulation terminator 130 may be communicatively coupled between the layer 2 switch 118 and the service edge 114. In this situation, it may be desirable or necessary for the service emulation terminator 130 to perform the decapsulation function 702. It should also be clear that, depending upon nesting practices and presence of multiple stacked carrier tags in the traffic, a decapsulation process may involve multiple stages of removing tags and encapsulation fields from traffic-bearing frames.

Figure 8:
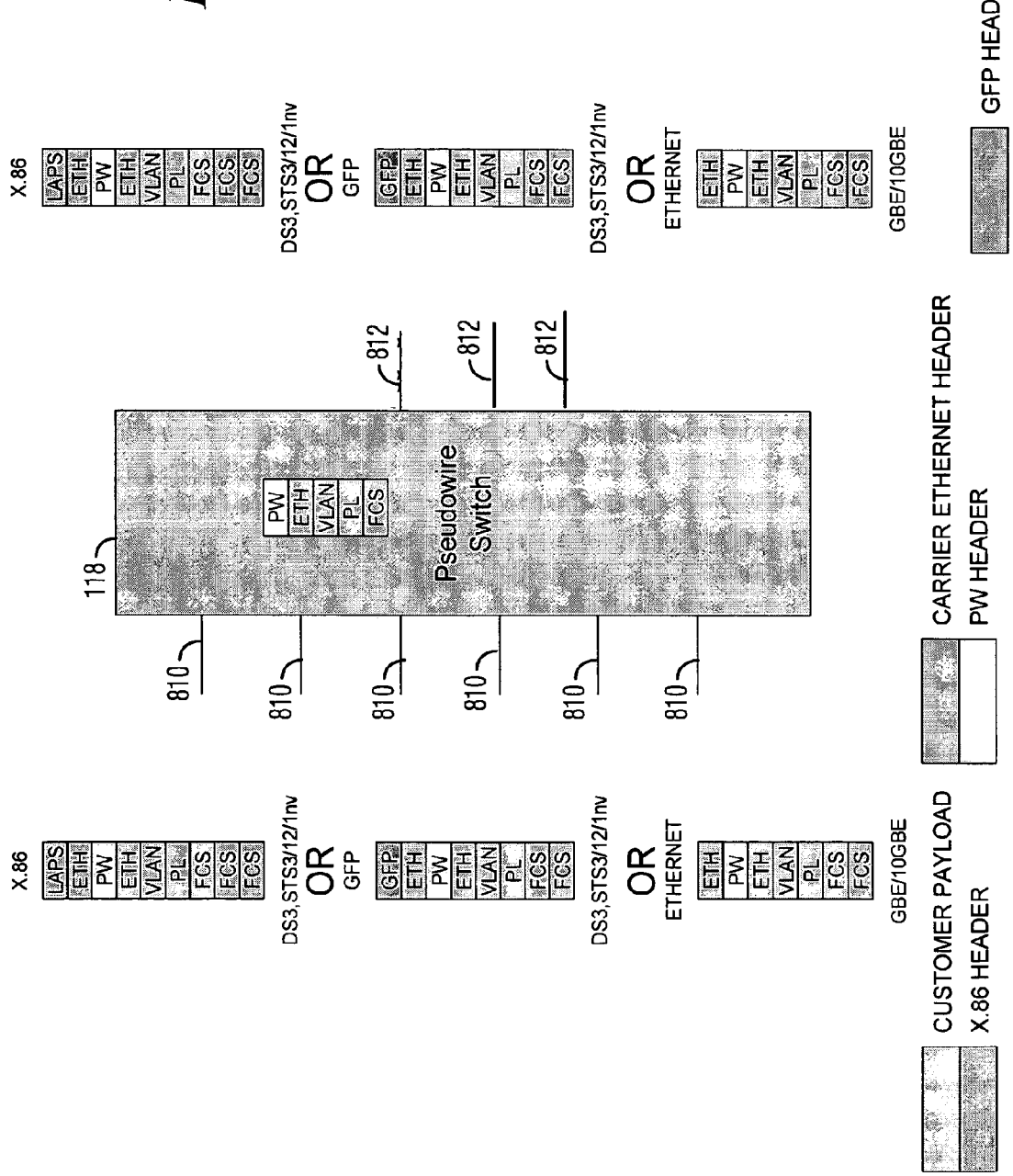
FIG. 8 illustrates framing formats in accordance with an embodiment of the present invention.

FIG. 8 illustrates framing formats in accordance with an embodiment of the present invention. FIG. 8 comprises a layer 2 switch 118 configured to perform switching functions based upon pseudowire labels. The input frames, i.e., the frames on the left side of the layer 2 switch 118, represent examples of frames that the layer 2 switch 118 may receive as input, and the output frames, i.e., the frames on the right side of the layer 2 switch 118 represent examples of frames that the layer 2 switch 118 may transmit as output. The input frames may be received on one or more aggregated pseudowire access pipes 810, and may route the frames to any one or more of the aggregated pseudowire network pipes 812.

It should be noted that the layer 2 switch 118 can be configured to replace the framing if necessary. For example, an X.86 frame may be received via an aggregated pseudowire access pipe 810 and routed to an output pipe as a GFP frame over DS3. In this example, the layer 2 switch 118 would remove the X.86 framing information and replace it with the GFP framing information.

It should also be noted that the switching or routing of the messages in these cases can remain based upon the pseudowire label, or other layer 2 identifiers. The framing, such as X.86, GFP, Ethernet, or the like, may not determine the routing. Rather, the layer 2 switch 118 evaluates the pseudowire label and switches or routes the traffic accordingly. In this manner, the routing or switching decisions may be performed independent of the services used by the customer and without evaluating the customer data.

Figure 9:
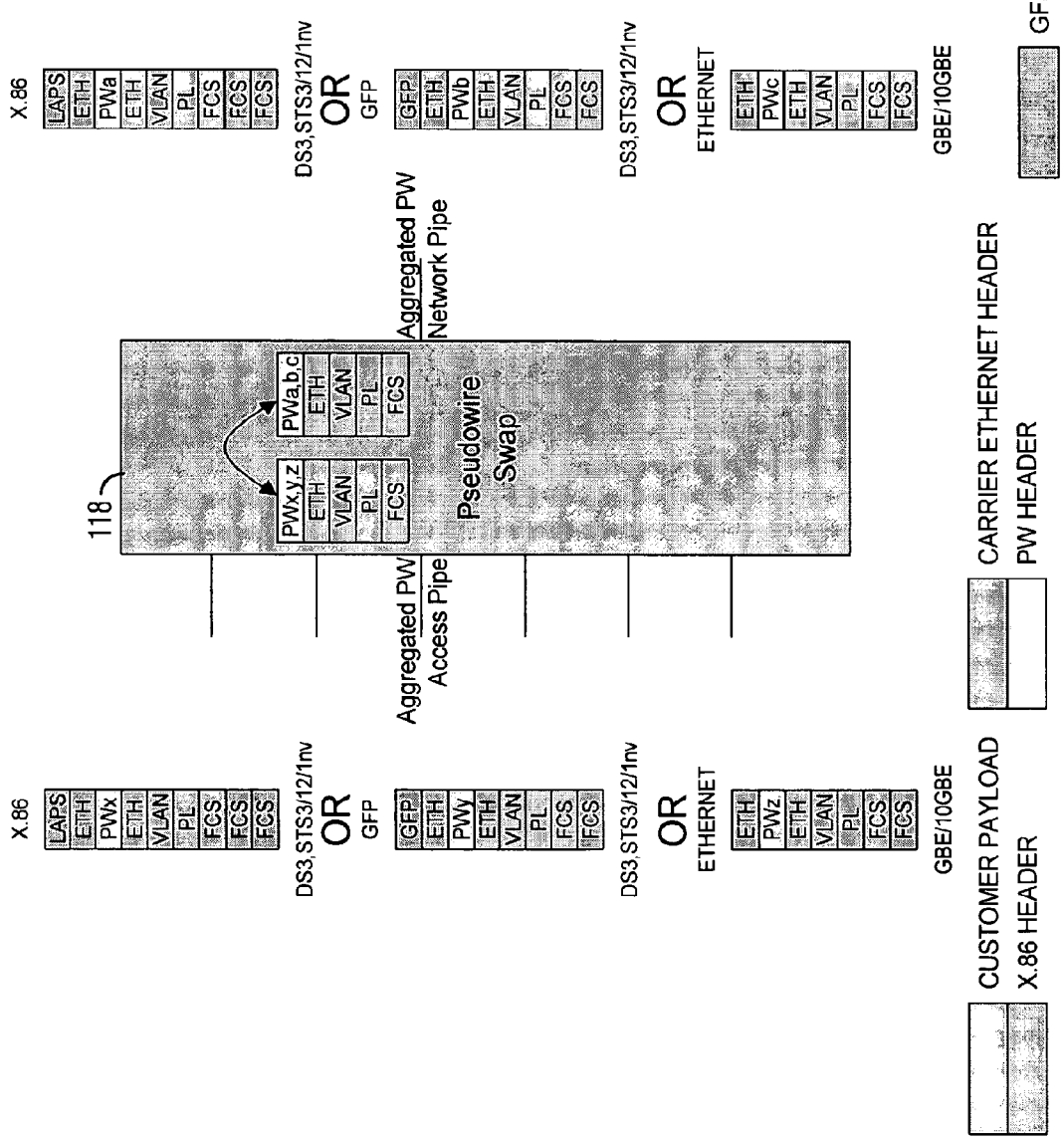
FIG. 9 illustrates a label swapping function in accordance with an embodiment of the present invention.

FIG. 9 illustrates a label swapping function in accordance with an embodiment of the present invention. The label switching function allows the layer 2 switch 118 to replace one service emulation instance mapping identifier with another. FIG. 9 is similar to FIG. 8, except that the pseudowire labels are switched between the input and output frames. For example, pseudowire label PWx is switched to pseduo-wire label PWa, pseudowire label PWy is switched to pseduo-wire label PWb, and pseudowire label PWz is switched to pseduo-wire label PWc.

Figure 10:
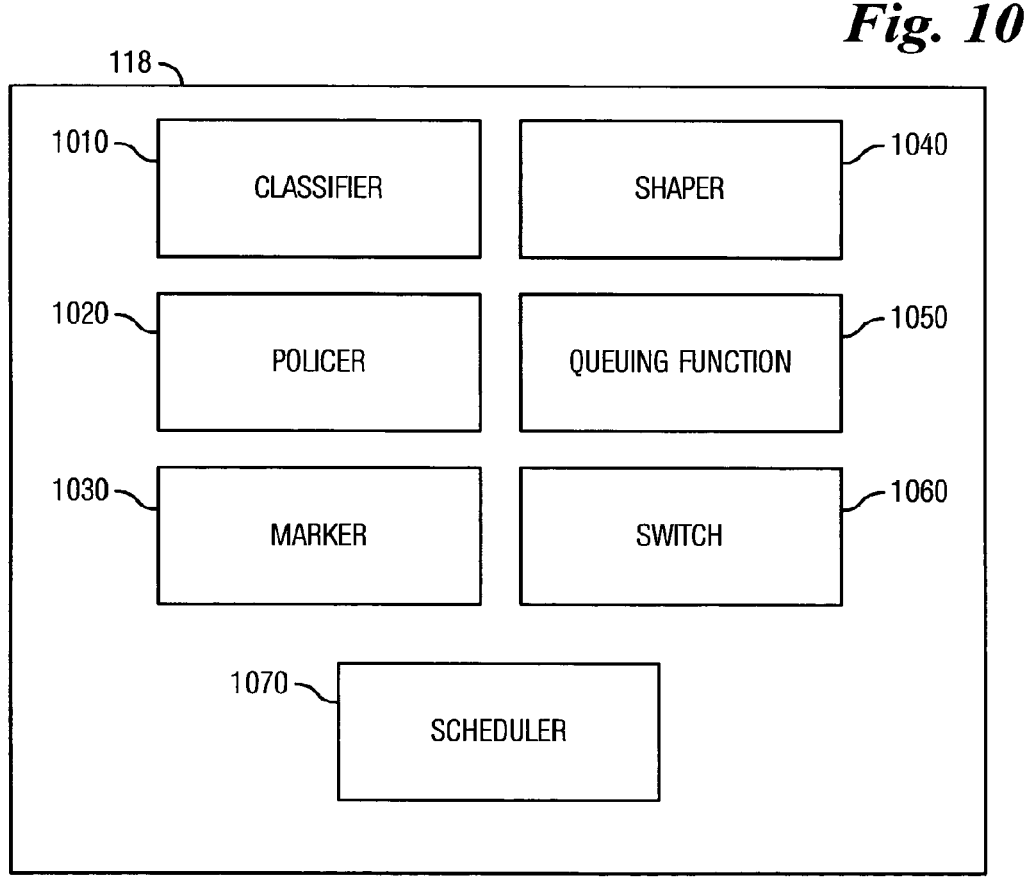
FIG. 10 illustrates functions that may be performed by a layer 2 switch in accordance with an embodiment of the present invention.

FIG. 10 illustrates functions that may be performed by a layer 2 switch in accordance with an embodiment of the present invention. The functions include a classifier 1010, a policer 1020, a marker 1030, a shaper 1040, a queuing function 1050, a switch 1060, and a scheduler 1070.

Generally, the classifier 1010 selects packets based on fields in the packet headers. The classification may be based upon interface, incoming carrier tag, Ethernet priority, and/or MPLS EXP bits. The classification of customer facing ports and service-edge facing ports may also be based upon Type of Service (TOS)/Diffsery Code Point (DSCP) in the IP header. Matching criteria may be, for example, exact, prefix-only, within a range, masked and/or the use of wildcard.

The policer 1020 (sometimes referred to as a rate-limiter or meter in Diffsery terminology) drops or determines non-conforming packets of a classified flow based upon a specified traffic profile, for example, average rate and maximum burst duration.

The marker 1030 sets the value of the Ethernet priority or TOS/DSCP byte or MPLS EXPerimental (EXP) Bits, using information from the classifier and/or policer.

The shaper 1040 delays packets within a classified flow to cause them to conform to a specified traffic profile.

The queuing function (or buffering) 1050 provides storage for packets prior to transmission. A queue also includes a function that determines which packets it admits. Examples of the admit function include a storage capacity or a threshold based upon packet marking.

The switch 1060 provides the means to transfer packets from one physical port to another.

The scheduler 1070 selects a packet from a queue and transmits it onto an output link in accordance with a selection discipline, for example, priority queuing, or some form of weighted service across multiple queues.

Figure 11:
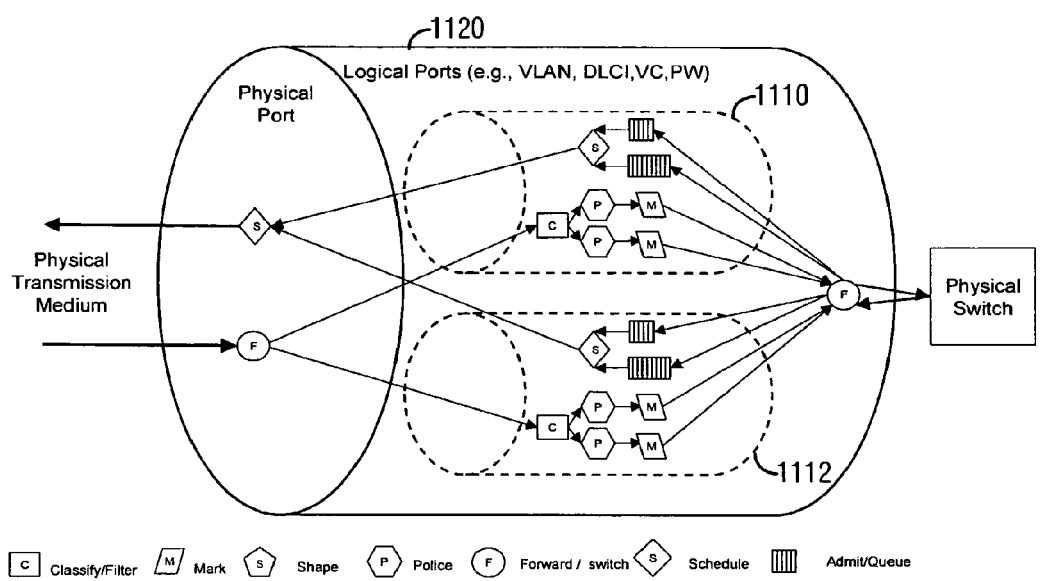
FIG. 11 illustrates QoS-related logical functions in accordance with an embodiment of the present invention.

FIG. 11 depicts the QoS-related logical functions on two logical ports 1110, 1112 of a physical port 1120 that may be coupled to the layer 2 switch 118 in accordance with one embodiment of the present invention. Generally, a logical port is a layer-2 sub-interface residing on a physical interface. Examples of a logical port or flow include an Ethernet MAC, an Ethernet VLAN, a FR DLCI, an ATM VCC, PPP/HDLC running on a TDM channel, an MPLS LSP, a pseudowire label, or the like. A logical port can implement one or more QoS functional modules, such as classifier, policer, marker, shaper, queue, switch, and scheduler discussed above with reference to FIG. 10. The icons defined at the bottom of the figure are shorthand notations for these QoS modules.

The physical port 1120 multiplexes the outputs of multiple logical ports onto a transmission medium using a scheduler, which forwards the received packets to the respective logical port, as shown in the right-hand side of the figure. As shown on the right-hand side of the figure, physical ports also provide interconnections to the physical switch so that a device can forward packets from a receiving logical port to other logical ports based upon forwarding table lookup.

Figure 12:
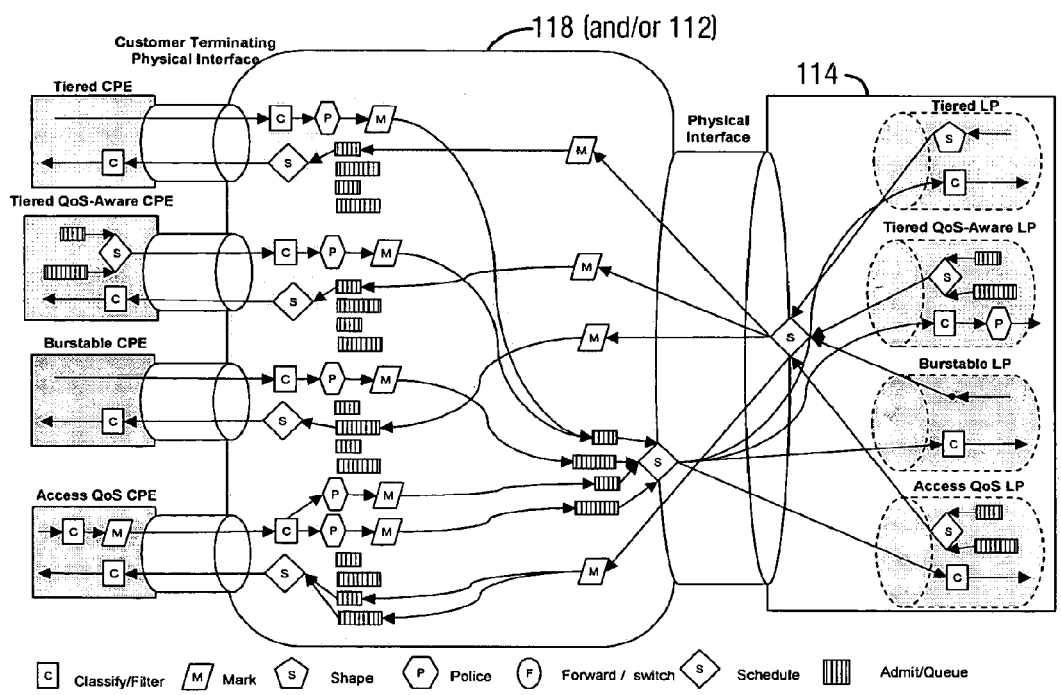
FIG. 12 illustrates QoS-related logical functions in accordance with an embodiment of the present invention.

FIG. 12 illustrates QoS-related logical functions in accordance with an embodiment of the present invention. In particular, FIG. 12 illustrates how QoS functional modules are used in the forwarding operations of CPE 116, the layer 2 switch 118, and the service edge 114 to create three access service classes: tiered, burstable, and access QoS-aware. These examples could apply to an IP Differentiated Service (Diffserv) QoS or to support a prioritized Ethernet service over the packet access network, as discussed below. Other access network services may be implemented based upon service requirements. For example, the access network may be configured such that control traffic could be allocated a separate queue.

The intent of a tiered access service is to provide a "logical pipe" from the CPE 116 to the service edge 114 that has characteristics of reserved capacity with minimal loss and delay variation. This is similar to the approach defined for QoS-aware access over a DSL network as defined by the DSL Forum in TR-59. In order to provide this service, the physical or logical port on the ingress packet access node (e.g., the building aggregation system 112, the layer 2 switch 118, or the like) classifies the traffic and polices it to the committed access rate (CAR). If the tiered CPE is QoS-aware, then it must prioritize traffic and schedule it such that CAR is not exceeded as shown in the left-hand side of FIG. 12. The access network process tiered traffic in a separate queue as shown in the figure for delivery to the tiered service edge on the right-hand side of the figure. When the traffic reaches the output logical port of the egress access node, the traffic is shaped to the customer-subscribed rate before being sent to the edge router. This avoids the situation where traffic would be conforming to the policer at ingress to the access network, but clumping that occurs in the access network could cause traffic to be non-conforming at the policer in the edge router. The tiered logical port on the service edge should shape to the capacity allocated to the flow across the access network if the service is not QoS aware, or in the case of a QoS-aware service edge, the aggregate output of a hierarchical scheduler should not exceed the capacity allocated to the flow across the access network. The access network nodes place tiered traffic in the same queue and deliver it to the tiered CPE.

The intent of a burstable service is to provide a best-effort type access to a service node. A specific amount of capacity is not guaranteed by the access network in this case. The CPE 116 and service edge 114 cannot be QoS-enabled in this case because capacity is not guaranteed in the access network. The ingress packet access node polices the traffic and marks some of the traffic as discard eligible to provide fairness amongst customers using best effort access in the inbound direction. These policer settings could be used in admission control and routing for burstable traffic. Burstable service traffic is placed in a queue separate from that used for other access traffic in this example. From the burstable service edge toward the customer, the service edge could be responsible for allocating capacity to each flow, or a policer could also be configured facing the service edge to provide fairness.

For access QoS aware service, the ingress access node operates on the CPE or application marked fields, such as IP Type of Service (TOS)/Differentiated service (Diffserv) or Ethernet Priority. In the example shown at the bottom of the figure, the ingress access node classifies traffic and directs it to one of two policers and markers. Such traffic is placed in two separate queues for forwarding across the access network to the service edge. In this example, it is assumed that the service edge does not perform policing and marking on ingress. However, on egress, the service node performs classification and hierarchical scheduling to the CAR for traffic destined to the access QoS CPE. The access network would mark and place this traffic into separate queues for delivery to the access QoS CPE.

Figure 13:
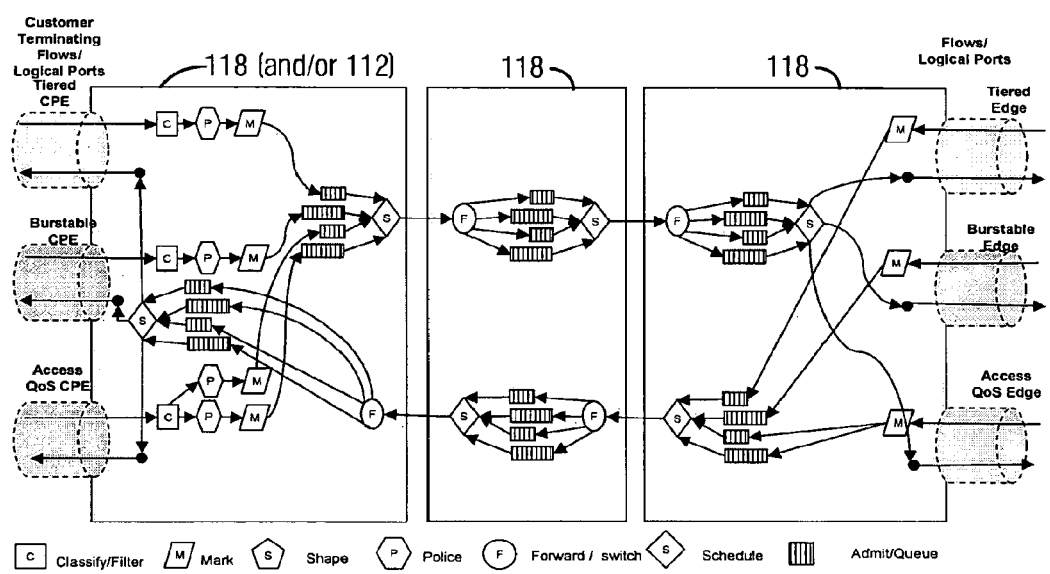
FIG. 13 illustrates an example in which an access network consists of one or more layer 2 switches in accordance with an exemplary embodiment of the present invention.

FIG. 13 illustrates an example in which an access network consists of one or more layer 2 switches in accordance with an embodiment of the present invention. In this example, the customer has three logical ports on a single physical port on the left-hand side of the figure. The ingress access node implements classification, policing, and marking for tiered, burstable, and access QoS as described above for each flow or logical port. The forwarding engine forwards a packet to an output logical port based on the marked QoS class value in the carrier tag. This QoS class marking in the carrier tag (e.g., Ethernet priority or MPLS EXP bits) is used at intermediate nodes and the egress packet access node is connected to the service edge to place the traffic in a specific queue. In the reverse direction, the layer 2 switch 118 connected to the service edge 114 interprets any marking done by the service edge 114, or may assign a mark based upon logical port (flow) on which the traffic is received. This marking in the QoS class of the carrier tag is used to place traffic in a particular queue for eventual delivery to the CPE logical port. Note that traffic is forwarded across each intermediate access network device without additional rate-limiting actions. Measurements, which include packet drop counts, byte and packet counters for conforming and non-conforming packets, queue high-water marks, or the like, on the access network devices may be used to ensure that the logical pipe is delivered to the service as detailed in the management section.

Exemplary approaches to operating an access network which embodies the present invention is disclosed in U.S. patent application Ser. No. 10/858,525, entitled "System And Method For Managing Communications In An Access Network", which is incorporated herein by reference.

A quality-of-service/class-of-service measure that is preferably implemented in accordance with the present teachings relates to the relative prioritization of traffic and the differentiation of per-hop behaviors as the traffic traverses switching and terminating elements. A traffic stream marked as high priority, such as a delay-sensitive voice signal, may receive preferential treatment in comparison to other flows as it undergoes queueing and forwarding in network elements, such as a series of layer 2 switches 118.

A traffic-bearing data frame may be marked with an indicator, which may be generally referred to as a handling classification value (HCV). A handling classification value may be included as part of a carrier tag, such as in a designated handling classification field in the carrier tag structure. Alternatively, a handling classification value may be encoded in the values of other fields, such as a carrier tag value. A handling classification value carried with a traffic-bearing data frame may indicate to network elements how the data frame is to be handled within each network element. Depending on a handling classification value presented in a data frame, a network element, such as a layer 2 switch 118, may preferentially expedite the data frame through the element or perform other actions which differentiate the handling of traffic. For example, the data frame having a particular HCV may be selectively placed into a special queue which is given priority handling by a scheduler function in a layer 2 switching element.

In accordance with an exemplary embodiment of the present teachings, a service emulation instance mapping identifier, such as a pseudowire label, comprises bits or fields in the label data structure which may be used to indicate a handling classification value. For example, a pseudowire label may be used which has three experimental bits, or 'EXP' bits, which are not otherwise designated for a specific purpose. These bits may be used to indicate a handling classification value as described above.

By using the pseudowire 'EXP' bits in this manner, a service provider or network operator may provide quality of service on aggregate LSPs and may also provide granular QoS on a per-pseudowire or per-virtual-circuit basis. It is likely that, in an access network embodying the present teachings, many flows traversing a common tunnel will have various levels of QoS requirements, depending on the type of pseudowire and the associated QoS requirements. Consequently, it is beneficial to have a mechanism to differentiate the QoS and forwarding behavior required on a hop-by-hop or path basis. In particular, path-wise QoS may be very useful in some cases. Layer 2 priority/PHB values in an encapsulated payload can be mapped into the pseudowire EXP bits. In intermediate label-switched routers, these bits may or may not be examined. However, at egress, these values may be used to assist in queuing and forwarding decisions. Further, where penultimate hop popping techniques are employed, the LSP EXP bits are often discarded with the popped label. Placing the QoS information in the EXP bits of the pseudowire label allows the end-to-end QoS to be retained, for example, as the pseudowire may be provided to a service edge or service emulation instance terminator. QoS indications can be used by, or passed through, a service edge or a core network.

Accordingly, a handling classification value may be indicated in a carrier tag, such as a tunnel label, to affect handling of an access traffic flow by access network elements and an equal or analogous value may also be replicated in a pseudowire label which is also carried in the same data frame. At any point in the originating, transporting, switching and terminating of a carrier-tagged communication as taught herein, the values of the handling classification fields (HCF) in multiple respective carrier tags may be set to equal values or set to reflect consistent handling classifications even if the values are not identical. The copying or setting of one HCF based upon another HCF may be done in an "upward" or "downward" fashion in a stack of carrier tags as might be appended to a data frame. For example, as carrier tags are stacked or added to data frame passing through the access network, values in the HCF of lower carrier tags already in the stack may be copied into HCF of newly added carrier tags higher in the stack. Values may also propagate downward when, for example, a value in a tunnel label HCF is carried into the EXP bits of a pseudowire label 'underneath' the tunnel label (for example, see the structures shown in FIG. 12). A setting of all such fields may also occur contemporaneously, such as when the encapsulation and carrier tagging of traffic is initially performed by a building aggregation system or layer 2 switch.

Depending on implementation, it may be appropriate to, for example, copy a handling classification value from a tunnel label to a PW label or vice versa, or to otherwise set these two fields to equal values or analogous values. As carrier tags are added to a data frame, it may also be appropriate to copy an existing handling classification value present in the data frame into a similar field in the newly added carrier tag data structure. In accordance with yet another exemplary implementation, a pseudowire label may receive the handling classification value just prior to being sent to a service edge. This implies that in some implementations the data frame may be transported partially or entirely through an access network without setting the pseudowire label to be consistent with the tunnel label, and then the pseudowire label value may be set as the data frame is prepared for handoff to the service edge or some other destination. This process would still accomplish communicating the handling classification value to the service edge via the pseudowire label even when the tunnel label is removed prior to reaching the service edge.

The present invention is not limited to any particular manipulations or sequencing of actions related to using a service emulation instance tag structure, such as a pseudowire label, or other form of demultiplexing or logical subinterface structure to convey handling classification information to network elements in an access network, a service edge or even a core network. This method of providing handling classification may be applied uniformly to all data frames regardless of any particular data protocol that happens to be encapsulated in a payload portion of each data frame.

Figure 14:
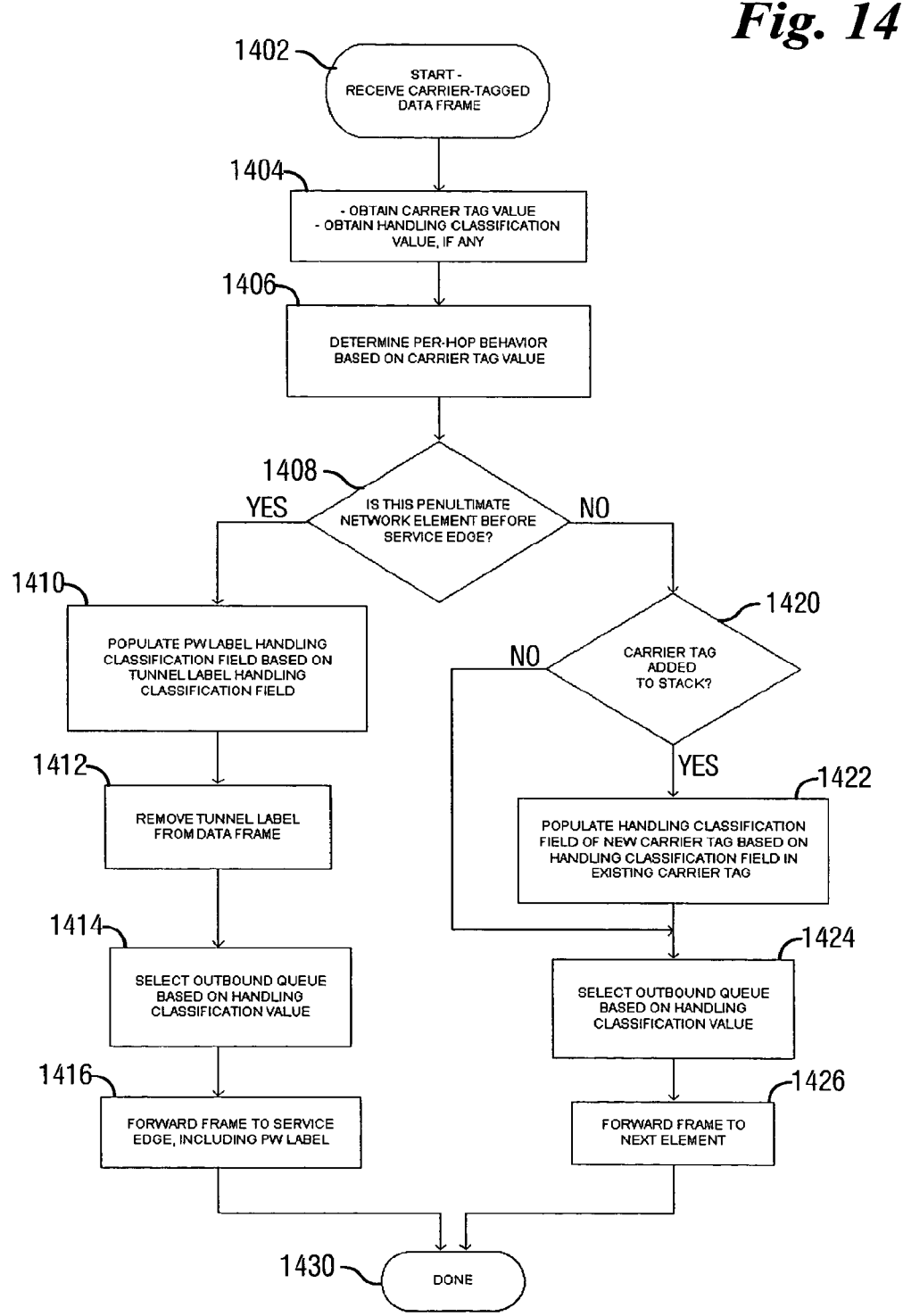
FIG. 14 illustrates a diagram of a process for processing and acting upon handling classification values in accordance with an exemplary embodiment of the present invention.

FIG. 14 is a diagram illustrating a process 1400 which may be applied to interpret and manipulate handling classification values as may be provided in carrier tagged data frames. Process 1400 may be performed by a layer 2 switch 118 in accordance with a preferred embodiment of the present invention. Process 1400 commences in step 1402 upon the receipt of a carrier tagged data frame, which may have originated from a customer location/building aggregation system, for example.

In step 1404, a carrier tagged value is obtained from the data frame which, as described herein, will be interpreted by the network element to determine how to process the received data frame. Additionally, a handling classification value may also be obtained if the carrier tag or some other element of encapsulation structure provides for a handling classification field in the field is populated with a value.

In step 1406, the carrier tagged value obtained in step 1404 is interpreted to determine an appropriate per-hop behavior (PHB) by which to process the data frame. As described before, the per-hop behavior may involve forwarding the data frame elsewhere and may involve manipulations to carrier tagging and encapsulating structures associate with the data frame, such as the pushing of additional carrier tags onto a stack of carrier tags supported by the data frame.

In step 1408, determination is made as to whether the network element performing process 1400 is the penultimate network element before reaching a service edge or other destination for the flow of which the data frame is a member. This may be expressed as part of the per-hop behavior and may be determined, for example, by consulting the contents of MIB/FIB databases or tables.

If, in step 1408, it is determined that the network element is the penultimate network element with respect to the termination of the flow at a service edge, then execution proceeds to step 1410 wherein the handling classification field (HCF) of a pseudowire label is said to a value based upon the handling classification field of a tunnel label or other carrier tag that has been used as the data frame has propagated to the access network. The purpose of step 1408 is to ensure that when the tunnel label or other carrier tag is removed as a result of penultimate hop popping (PHP), the handling classification value will nevertheless be available to the service edge by using a pseudowire label HCF as a vehicle for the value. The populating of the pseudowire label HCF may simply be a matter of copying the value from the HCF of the tunnel label or carrier tag. Otherwise, the HCF of the tunnel label or carrier tag may be mapped to a different value that will have significance to the service edge or other elements downstream, and then the pseudowire label HCF may be populated with the different value. As an alternative to step 1410, a practice may be adopted wherein a building aggregation system or other originator of carrier tagged flows automatically populates the pseudowire label when the traffic is initially encapsulated and carrier tagged.

Following step 1410, step 1412 is executed wherein the tunnel label or other carrier tag (or perhaps multiples of these) are removed from the data frame in preparation for sending the data frame to the service edge.

In step 1414, a function, such as a forwarder function described elsewhere herein, selects a particular outbound queue based upon the handling classification value that has been gleaned from the earlier steps. For example, the handling classification value may indicate that the carrier tag flow, of which the data frame is a part, needs to be handled expeditiously and with minimal delay. Accordingly then the outbound queue may be selected that receives priority handling in comparison to other outbound queues.

In step 1416, the data frame is sent to the appropriate service edge or other destination including the pseudowire label and its associated handling classification field, which may be used by or transparently passed by a service edge or other core network components. Process 1400 then concludes in step 1430.

Returning to step 1408, if it is determined that the network element is not a penultimate element with respect to the flow comprising the data frame, then execution proceeds to step 1420 wherein it is determined whether the per hop behavior specified in the processing of step 1406 resulted in the adding or 'pushing' of one or more carrier tags onto the data frame carrier tag stack. If so, then step 1422 is performed to populate the HCF of any newly added carrier tag values or carrier tag structures in a manner consistent with the HCF in existing carrier tags that arrived with the data frame in step 1402.

Thereafter, step 1424 is performed to select an outbound queue based on the handling classification value in a similar manner to the operation of step 1414 described above. Then, step 1426 is performed to forward the data frame to the next network element as prescribed by the per-hop behavior derived in step 1406. Process 1400 then concludes in step 1430.

Returning to step 1420, if it is determined that no new carrier tags were added to the stack as a result of the per-hop behavior discovered in step 1406, then execution skips step 1422 and simply proceeds with steps 1424 and 1426 as are a described.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving, at one of a plurality of network elements, communication data comprising a first carrier tag having a first handling classification field and a first handling classification value included in the first handling classification field;
    determining per-hop behavior based on the first handling classification value;
    determining whether one of the plurality of network elements is in a first position relative to a service edge;
    responsive to a determination that the one of the plurality of network elements is in the first position, forwarding the communication data to the service edge;
    responsive to a determination that the one of the plurality of network elements is not in the first position, determining whether the per-hop behavior resulted in a second carrier tag comprising a second handling classification field being added to the communication data;
    responsive to a determination that a second carrier tag has not been added, processing the communication data in accordance with the first handling classification value to forward the communication data to a next network element; and
    responsive to a determination that a second carrier tag has been added, populating the second handling classification field and setting a second handling classification value based on the first handling classification value prior to forwarding the communication data comprising the second handling classification field to the next network element.

2. The method of claim 1, wherein the first carrier tag is removed from the communication data when the second carrier tag exists.

3. The method of claim 1, wherein the setting the value of the second handling classification field comprises copying the value of the first handling classification field into the second handling classification field.

4. An apparatus comprising:
    at least one processor; and
    at least one memory including computer program code,
        wherein the at least one memory and the computer program code configured to, with the at least one processor, cause the apparatus to perform at least the following:
        receive, at one of a plurality of network elements, a communication comprising a first carrier tag having a first handling classification field and a first handling classification value included in the first handling classification field;
        determine per-hop behavior based on the first handling classification value;
        determine whether the one of a plurality of network elements is in a first position relative to a service edge;
        responsive to a determination that the one of the plurality of network elements is in the first position, forward the communication to the service edge;
        responsive to a determination that the one of the plurality of network elements is not in the first position, determe whether the per-hop behavior resulted in a second carrier tag comprising a second handling classification field being added to the communication;
        responsive to a determination that a second carrier tag has not been added, process the communication in accordance with the first handling classification value to forward the communication to a next network element; and
        responsive to a determination that a second carrier tag has been added, populate the second handling classification field and set a second handling classification value based on the first handling classification value prior to forwarding the communication comprising the second handling classification field to the next network element.

5. The apparatus of claim 4, wherein the apparatus is further caused to:
    remove the first carrier tag from the communication when the second carrier tag exists.

6. The apparatus of claim 4, wherein the apparatus is caused to set the value of the second handling classification field by copying the value of the first handling classification field into the second handling classification field.

7. A system comprising:
    a plurality of network elements, one of the plurality of network elements receiving communication data comprising a first carrier tag having a first handling classification field and a first handling classification value included in the first handling classification field;
    one or more processors for determining per-hop behavior based on the first handling classification value;
    the one or more processors determining whether the one of the plurality of network elements is in a first position relative to a service edge;

responsive to a determination that the one of the plurality of network elements is in the first position, forwarding the communication data to the service edge;

responsive to a determination that the one of the plurality of network elements is not in the first position, determining whether the per-hop behavior resulted in a second carrier tag comprising a second handling classification field being added to the communication data;

responsive to a determination that a second carrier tag has not been added, processing the communication data in accordance with the first handling classification value to forward the communication data to a next network element; and responsive to a determination that a second carrier tag has been added, populating the second handling classification field and setting a second handling classification value based on the first handling classification value prior to forwarding the communication data comprising the second handling classification field to the next network element.

8. The system of claim 7, wherein the one or more processors removes the first carrier tag from the communication when the second carrier tag exists.

9. The system of claim 7, wherein the one or more processors sets the value of the second handling classification field by copying the value of the first handling classification field into the second handling classification field.

\* \* \* \* \*